US011615080B1

(12) United States Patent
Naganathan et al.

(10) Patent No.: US 11,615,080 B1
(45) Date of Patent: Mar. 28, 2023

(54) SYSTEM, METHOD, AND COMPUTER PROGRAM FOR CONVERTING A NATURAL LANGUAGE QUERY TO A NESTED DATABASE QUERY

(71) Applicant: Apttus Corporation, San Mateo, CA (US)

(72) Inventors: Venkatraman Naganathan, San Jose, CA (US); Stanley Bryce Bochenek, San Francisco, CA (US); Koti R. Nandyala, Fremont, CA (US)

(73) Assignee: Apttus Corporation, San Mateo, CA (US)

( * ) Notice: Subject to any disclaimer, the term of this patent is extended or adjusted under 35 U.S.C. 154(b) by 180 days.

(21) Appl. No.: 16/839,816

(22) Filed: Apr. 3, 2020

(51) Int. Cl.
G06F 16/242 (2019.01)
G06F 40/40 (2020.01)
G06F 16/2453 (2019.01)

(52) U.S. Cl.
CPC ...... *G06F 16/243* (2019.01); *G06F 16/24542* (2019.01); *G06F 40/40* (2020.01)

(58) Field of Classification Search
CPC ... G06F 16/243; G06F 16/24542; G06F 40/40
See application file for complete search history.

(56) References Cited

U.S. PATENT DOCUMENTS 5,960,407 A 9/1999 Vivona
6,473,084 B1 10/2002 Phillips et al.
(Continued)

FOREIGN PATENT DOCUMENTS

CA 2742395 1/2019
CN 1315705 3/2001
(Continued)

OTHER PUBLICATIONS

Oracle: Automating the Quote-to-Cash Process: An Oracle White Paper, Jun. 2009, pp. 1-19, 2009.
(Continued)

*Primary Examiner* — Aleksandr Kerzhner
*Assistant Examiner* — Aryan D Toughiry
(74) *Attorney, Agent, or Firm* — Lessani Law Group, PC

(57) ABSTRACT

The present disclosure describes a system, method, and computer program for converting natural language queries to structured database queries, including nested database queries. In response to receiving a natural language query for a database, an NLU model is applied to the query to identify an intent and entities associated with the query. The entities are tagged with an entity type that enables the system to identify any database object names, candidate query fields, operands, and contextual entities in the query. From the tagged entities, the system identifies one or more valid explicit, implicit, and indirect references to database objects in the user query. If there is only one valid reference to a database object in the user's query, the system proceeds with steps to create a single-object query. If there are valid references to two or more database objects in the query, the system proceeds with steps to create a nested database query. This includes grouping candidate query fields, operands, and contextual entities by independent object name, and evaluating each group separately to identify subject fields, conditional parameters, order/sort criteria, and record count limits for each group.

21 Claims, 16 Drawing Sheets

(56) References Cited

U.S. PATENT DOCUMENTS

| | | |
|---|---|---|
| 7,328,177 B1 | 2/2008 | Lin-Hendel |
| 7,574,381 B1 | 8/2009 | Lin-Hendel |
| 7,725,358 B1 | 5/2010 | Brown et al. |
| 8,498,954 B2 | 7/2013 | Malov et al. |
| 8,644,842 B2 | 2/2014 | Arrasvuori et al. |
| 9,519,907 B2 | 12/2016 | Carter, III et al. |
| 10,289,261 B2 | 5/2019 | Aggarwal et al. |
| 10,521,491 B2 | 12/2019 | Krappe et al. |
| 10,621,640 B2 | 4/2020 | Krappe et al. |
| 10,783,575 B1 | 9/2020 | Krappe et al. |
| 11,232,508 B2 | 1/2022 | Krappe |
| 11,455,373 B2 | 9/2022 | Krappe et al. |
| 2002/0040332 A1 | 4/2002 | Maari et al. |
| 2003/0033240 A1 | 2/2003 | Balson et al. |
| 2006/0100912 A1 | 5/2006 | Kumar et al. |
| 2006/0136470 A1* | 6/2006 | Dettinger ............ G06F 16/2471 707/999.102 |
| 2007/0016536 A1 | 1/2007 | Mirlas et al. |
| 2007/0039209 A1 | 2/2007 | White et al. |
| 2007/0087756 A1 | 4/2007 | Hoffberg |
| 2007/0162373 A1 | 7/2007 | Kongtcheu |
| 2008/0046355 A1 | 2/2008 | Lo |
| 2008/0091551 A1 | 4/2008 | Olheiser et al. |
| 2009/0048937 A1 | 2/2009 | Contreras et al. |
| 2009/0222319 A1 | 9/2009 | Cao et al. |
| 2009/0234710 A1 | 9/2009 | Belgaied Hassine et al. |
| 2009/0299974 A1 | 12/2009 | Kataoka et al. |
| 2009/0327166 A1 | 12/2009 | Carter, III et al. |
| 2010/0179859 A1 | 7/2010 | Davis et al. |
| 2010/0262478 A1 | 10/2010 | Bamborough et al. |
| 2010/0306120 A1 | 12/2010 | Ciptawilangga |
| 2011/0246136 A1 | 10/2011 | Haratsch et al. |
| 2011/0246434 A1 | 10/2011 | Cheenath et al. |
| 2012/0173384 A1 | 7/2012 | Herrmann et al. |
| 2012/0221410 A1 | 8/2012 | Bennett et al. |
| 2012/0246035 A1 | 9/2012 | Cross et al. |
| 2012/0254092 A1 | 10/2012 | Malov et al. |
| 2012/0259801 A1* | 10/2012 | Ji ............................ G06N 20/00 706/12 |
| 2013/0103391 A1 | 4/2013 | Millmore et al. |
| 2013/0132273 A1 | 5/2013 | Stiege et al. |
| 2014/0025529 A1 | 1/2014 | Honeycutt et al. |
| 2014/0136443 A1 | 5/2014 | Kinsey, II et al. |
| 2014/0149273 A1 | 5/2014 | Angell et al. |
| 2015/0120526 A1 | 4/2015 | Peterffy et al. |
| 2015/0142704 A1 | 5/2015 | London |
| 2015/0309705 A1 | 10/2015 | Keeler et al. |
| 2015/0348551 A1 | 12/2015 | Gruber et al. |
| 2015/0378156 A1 | 12/2015 | Kuehne |
| 2016/0034923 A1 | 2/2016 | Majumdar et al. |
| 2017/0004588 A1 | 1/2017 | Isaacson et al. |
| 2017/0068670 A1 | 3/2017 | Orr et al. |
| 2017/0124176 A1 | 5/2017 | Beznos et al. |
| 2017/0124655 A1 | 5/2017 | Crabtree et al. |
| 2017/0235732 A1 | 8/2017 | Williams et al. |
| 2017/0243107 A1* | 8/2017 | Jolley ................... G06F 16/951 |
| 2017/0351241 A1 | 12/2017 | Bowers et al. |
| 2017/0358024 A1 | 12/2017 | Mattingly et al. |
| 2018/0005208 A1 | 1/2018 | Aggarwal et al. |
| 2018/0096406 A1 | 4/2018 | Krappe et al. |
| 2018/0218032 A1* | 8/2018 | Wong .................. G06F 16/3341 |
| 2018/0285595 A1 | 10/2018 | Jessen |
| 2018/0293640 A1 | 10/2018 | Krappe |
| 2018/0336247 A1 | 11/2018 | Ignatyev et al. |
| 2018/0349324 A1 | 12/2018 | Krappe et al. |
| 2018/0349377 A1* | 12/2018 | Verma .................... G06N 5/022 |
| 2019/0258632 A1 | 8/2019 | Pal et al. |
| 2019/0370388 A1 | 12/2019 | Li et al. |
| 2020/0057946 A1* | 2/2020 | Singaraju ............... G06N 20/00 |
| 2020/0065354 A1 | 2/2020 | Krappe et al. |
| 2021/0089587 A1 | 3/2021 | Gupta et al. |
| 2021/0090575 A1 | 3/2021 | Mahmood et al. |

FOREIGN PATENT DOCUMENTS

| | | |
|---|---|---|
| CN | 106910091 | 6/2017 |
| EP | 2650776 | 10/2013 |
| EP | 3073421 | 9/2016 |
| JP | 2001290977 | 10/2001 |
| JP | 2017146909 | 8/2017 |
| WO | 0052605 | 9/2000 |
| WO | 03003146 | 1/2003 |
| WO | 2015106353 | 7/2015 |

OTHER PUBLICATIONS

McCormick, M., "What is Quote to Cash?" Jan. 20, 2016, Blog, BlackCurve, pp. 1-8, 2016.

Microsoft/APTTUS: Ultimate Guide to Quote-To-Cash for Microsoft Customers, Web Archives, Oct. 1, 2015, pp. 1-28.

Morelli et al., "IBM SPSS Predictive Analytics: Optimizing Decisions at the point of impact", pp. 1-59, 2010.

Wainewright, Phil, "Salesforce, Microsoft quote-to-cash partner Apttus raises $88m", Sep. 29, 2016, pp. 1-7.

Wainewright, Phil, Apttus Applies Azure Machine Learning to Quote-to-Cash, Apr. 3, 2016, pp. 1-5.

Wireless News: Banglalink Keeps Mobile Subscribers Using Predictive Analytics with KXEN, Close-Up Media, Inc., pp. 1-2, Oct. 5, 2013.

Riggins, J., "Interview Quote-to-Cash Pioneers Apttus Links Leads to Revenue", May 21, 2014, pp. 1-7.

Xie, Qitao et al., "Chatbot Application on Cryptocurrency", 2019 IEEE Conference on Computational Intelligence for Financial Engineering & Economics, pp. 1-8, 2019.

Spedicato G., et al., Machine Learning Methods to Perform Pricing Optimization. A Comparison with Standard GLMs, Dec. 2018.

* cited by examiner

IDENTIFY SUBJECT FIELDS FROM CANDIDATE QUERY FIELDS

FIG. 8

SYSTEM, METHOD, AND COMPUTER PROGRAM FOR CONVERTING A NATURAL LANGUAGE QUERY TO A NESTED DATABASE QUERY

BACKGROUND OF THE INVENTION

1. Field of the Invention

This invention relates generally to a natural language interface to a database system, and, more specifically, to converting a natural language query to a structured database query in a B2B environment.

2. Description of the Background Art

With the advent of natural language chatbots, such as SIRI and ALEXA, users are increasingly employing bots to complete routine tasks, such as playing music, checking the weather, etc. Natural language bots are typically used in the consumer space, and they are designed to work with search engines that perform searches based on natural language key words.

Natural language bots can also be useful in business-to-business (B2B) applications. However, B2B systems are driven by heavy-duty data that is powered by complex databases, and chatbots are not designed to interface with such databases. One cannot query such a database using natural language key words due to the variability, complexity, and inherent ambiguity in natural language utterances.

Accessing data in B2B database requires a highly-structured database query language, such as SQL. A typical database query will reference a database object (e.g., a database table), one or more subject fields corresponding to a database object, one or more conditions referencing database fields, and sort/order by criteria. There are no implicit fields, semantic ambiguity, or fuzzy terms in a database query (see description of implicit fields, semantic ambiguity, and fuzzy terms below).

The highly-structured and complex nature of database queries present a challenge for natural language bots. Natural language queries are relatively unstructured and highly variable. For example:

Terms that might correspond to database fields can appear anywhere in a natural language query and some may be referred to only implicitly. For example, in the request, "show me quotes over $20 k from last year", the price and created date fields are not specified explicitly even though the $20 k implicitly refers to the quoted price and "from last year" implicitly refers to the date the quote was created.

Keywords in a natural language query can have multiple meanings, depending on the context. For example, the word "created" could be used to refer to a person that created an object/file or a date on which the object/file was created.

Ambiguity is inherent in natural language, and the database field to which a term corresponds depends on context. For example, take the following two phrases:
"Show me agreements I created."
"Show me agreements I created last year."
"Show me agreements that were created last year."
Assume the database object for agreements has the fields "createdBy" and "createdDate." Then, in the first two phrases, the entity "created" should be mapped to the "createdBy" field, and in the last phrase the entity "created" should be mapped to the "createdDate" field.

There are many different ways to express the same request, including many variations in the way object names, operators, operands, and conditions may be expressed. For example, the following two phrases ask for the same thing:
"Show me the last 3 agreements over $200 k from last year that I created in Q4 2020."
"Show me the most recent 3 agreements from 2020 that I created in the $4^{th}$ quarter with an account value greater than $200 k."

Phrases may be fuzzy, such as "a couple of weeks ago," "in a few months," "around $200 k," etc.

A natural language bot for a B2B application must be able to effectively translate a natural language query to a database query. Known natural language bots use rudimentary natural language processing to parse part of a sentence, which, when used as an interface to a B2B base, results in an incomplete translation of the natural language query to a database query. This leads to incorrect or suboptimal results. Moreover, some user queries should translate to a nested database query, wherein one database query is a conditional parameter of another database query. Known natural language bots do not have capability to convert a natural language query to a nested database query.

Therefore, there is demand for a system that can effectively translate a natural language query to a database query in B2B applications, including a nested database query where applicable.

SUMMARY OF THE DISCLOSURE

The present disclosure relates to a natural language system for querying a database in a B2B system. Specifically, the present disclosure describes a system, method, and computer program for converting natural language queries to structured database queries, including nested database queries.

A computer system (i.e., a natural language bot) receives a user's natural language query for a B2B application. An NLU engine within the system applies an NLU model to the query to identify an intent and entities associated with the query. The entities correspond to the parameters of the query. The NLU engine tags the entities with an entity type that enables the system to identify a number of different types of entities in the query, include database object names, candidate query fields, operands, and contextual entities.

The system determines the number of valid database object references in the user query, where a database object may be referenced explicitly, implicitly, or indirectly. If there is only one valid reference to a database object in the user's query, the system proceeds with steps to create a single-object query. If there are valid references to two or more database objects in the query, the system proceeds with steps to create a nested database query that has a parent database object and one more child database objects.

Creating a Single-Object Database Query

If there is only one valid reference to a database object in the user's query, the system evaluates the candidate query fields and operands all together to identify any subject fields, conditional expressions, record count limit, and ordering/sorting criteria for the query. Identifying a conditional expression for a query includes determining whether any of the candidate query fields are subject fields and then matching the remaining candidate query fields (i.e., those that are not subject fields) to operands based on query parameters, operand type, and location of operands relative to the remaining candidate query fields. The system creates a database query plan with the results of such evaluation and then generates a single object database query based on the query plan.

Creating a Nested Database Query

If there are valid references to a plurality of database objects in the user query, the system sorts the candidate query fields, contextual entities, and operands into groups, wherein each group corresponds to one of the valid database objects referenced. The system then creates a database query plan for each group by separately evaluating the candidate query fields and operands in each group to identify any subject fields, conditional expressions, record count limit and order/sorting criteria for the group. The system generates a nested database query based on the query plans for the groups. The database object corresponding to the intent is the parent database object, and the system generates the parent query (i.e., the highest-level query) from the group associated with the parent database object. The database queries corresponding to the other groups are part of the conditional parameters of the parent query.

In certain embodiments, prior to proceeding with creating a nested database query, the system determines whether the user's query can be converted to a single-object query despite having multiple independent object names. Specifically, the system determines if the database object not associated with the intent effectively translates to a field for the database object associated with the intent. If so, the system generates a single-object database query based on the user's natural language query.

In certain embodiments, when there are multiple valid database object references in the user's query, the system also determines if the intent predicted by the NLU engine is correct and self-corrects the intent as necessary before generating the nested database query.

In certain embodiments, the system sorts the candidate query fields, operands, and contextual entities into groups as follows:
  each object-specific field and immediately following operand is grouped with the database object corresponding to the object-specific field;
  each object-specific contextual field is grouped with the database object corresponding to the object-specific contextual field; and
  each remaining entity is grouped based on the location of entity relative to the valid database object references and one or more transitions in the query, wherein, as explained in more detail below, a transition is a conjunction separating one object and its related query fields and operands from another object.

BRIEF DESCRIPTION OF THE DRAWINGS

FIG. 8 is a screen shot that illustrates an example of queries used to train an NLU model to identify a "lookup-Quote" intent.

DETAILED DESCRIPTION OF THE PREFERRED EMBODIMENTS

The present disclosure relates to a natural language system for querying a database in a B2B system. Specifically, the present disclosure describes a system, method, and computer program for converting a natural language query to a structured database query, including a nested database query where applicable. The method is performed by a computer system ("the system").

A structured database query is a query that requires specific syntax and delineates the database object, subject fields of the query, and conditional fields. A SQL query is an example of a structured database query. A single-object query only queries one database object. A nested query queries multiple database objects. More specifically, a nested database query includes one or more database queries within another database query.

An example of a natural language query that would convert into a single-level query is the following:
  "Show me the last 3 agreements over $200 k from last year that I created ending in Q4 2020."

This can be converted to the following structured database query:
  SELECT*FROM agreements WHERE createdDate>=01/01/2018 and createdDate <=12/31/2018 AND createdBy=<username> AND endDate>=10/01/2020 and endDate<=12/31/2020 and ACV>=200000 LIMIT 3

In the above example, the database object "agreements" is the only database object being queried.

An example of a natural language query that would convert into a nested query is as follows:
  "Show me the last 5 line items that have an ACV of more than $500 k and are about to close for opportunities that are past due."

This can be converted to the following database query:
  SELECT*FROM opportunityLineItems WHERE acv>=500000 and closeDate>=today AND closeDate<=[30 days from now] AND opportunityId IN (SELECT Id FROM Opportunity WHERE closeDate<today) ORDER BY LastModifiedDate DESC LIMIT 5

1. Overview

Figure 1A:
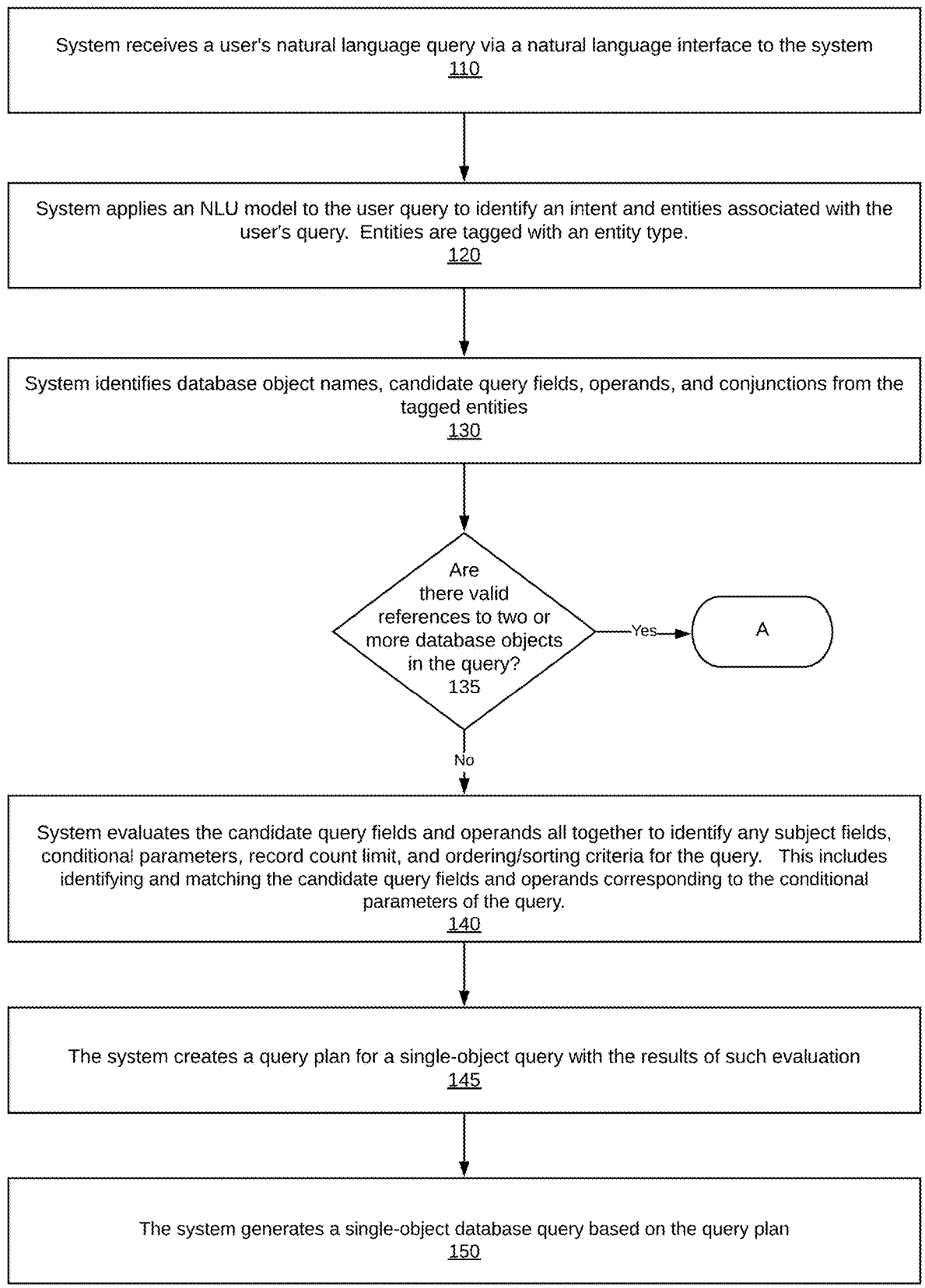
FIGS. 1A-1B are flowcharts that illustrate a method, according to one embodiment, for converting a natural language query into a single-object or nested database query.
Figure 1B:
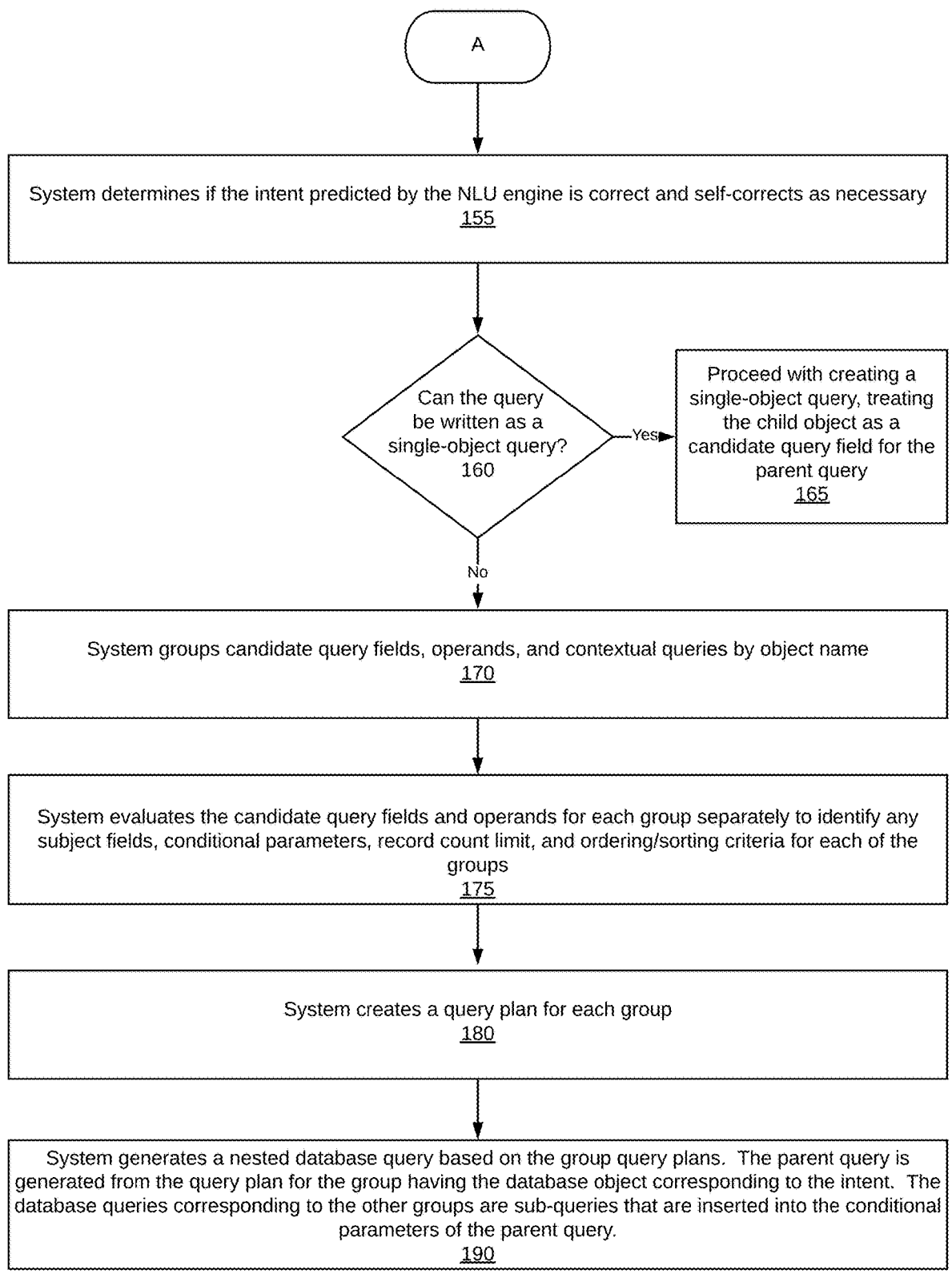
Figure 2A:
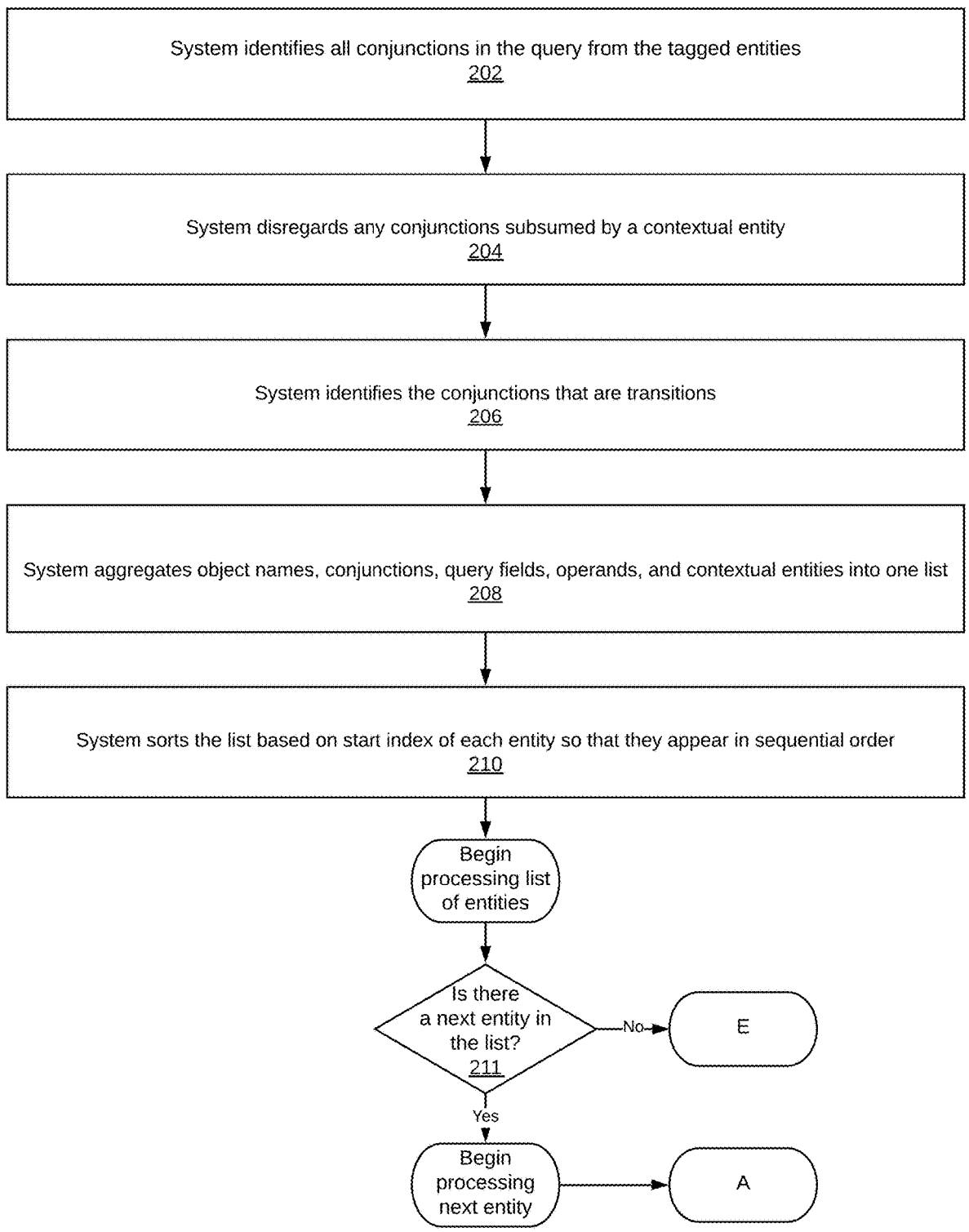
FIGS. 2A-2F are flowcharts that illustrated a method, according to one embodiment, for grouping candidate query fields, operands, and contextual entities in the query with the applicable object in the query.
Figure 2B:
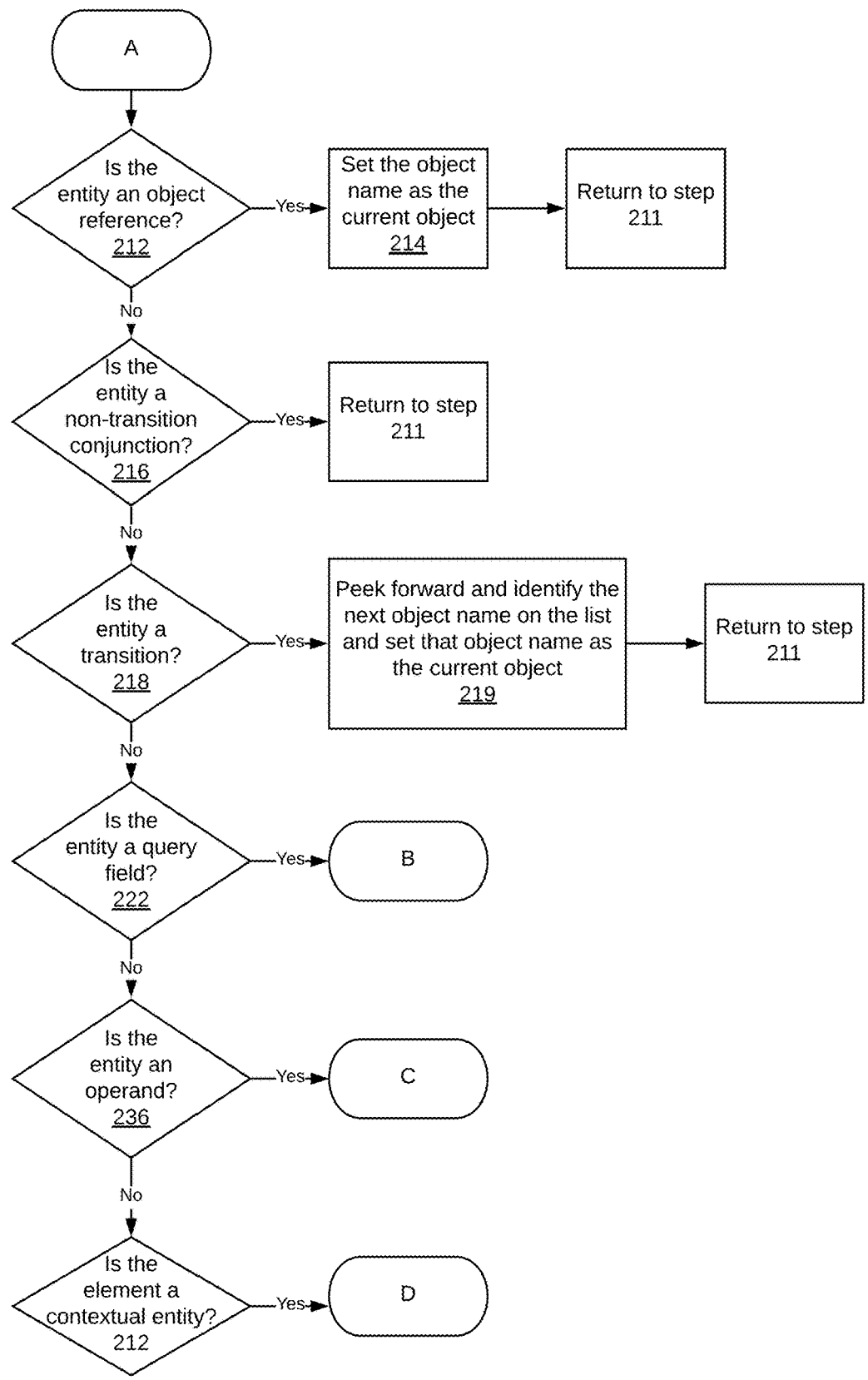
Figure 2C:
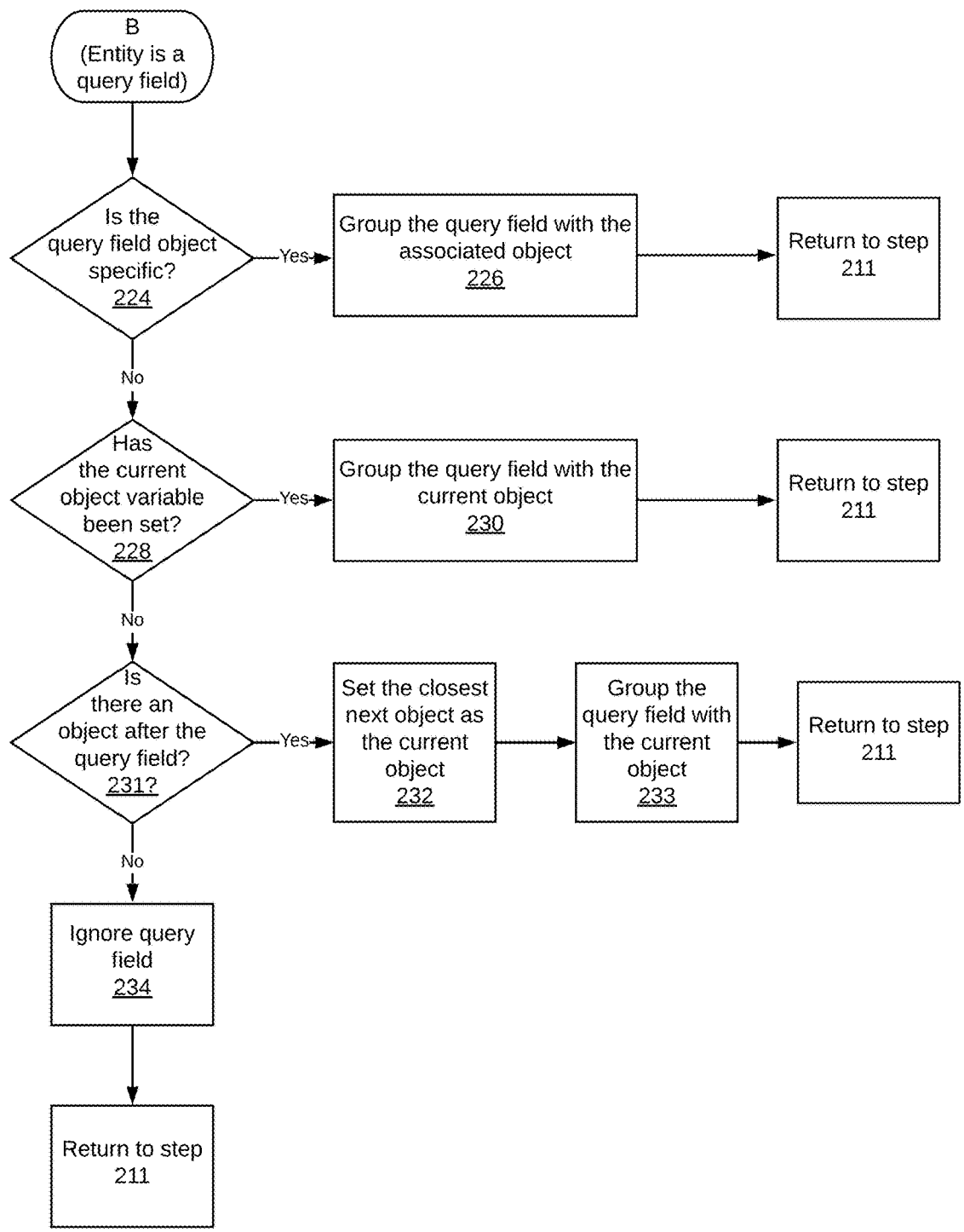
Figure 2D:
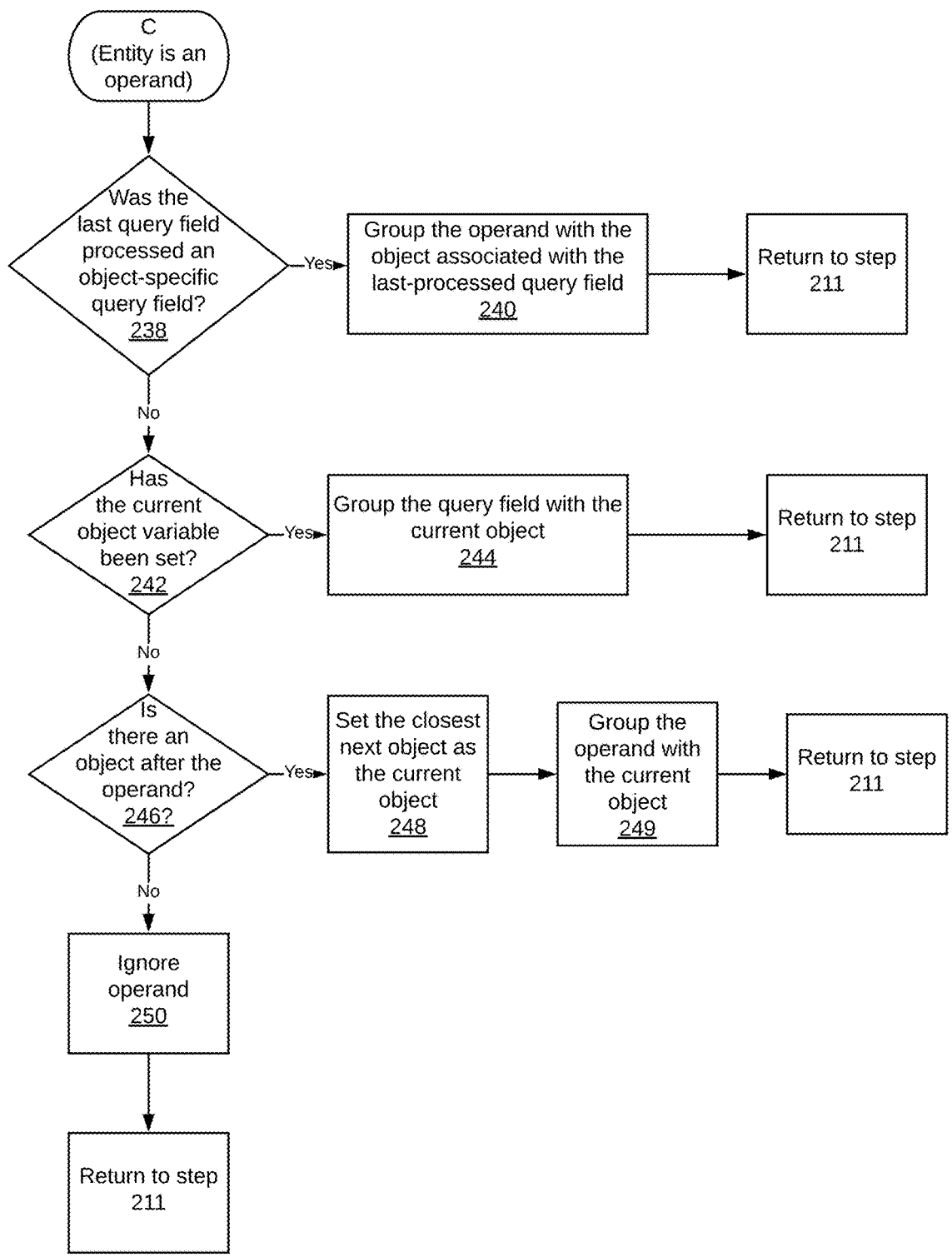
Figure 2E:
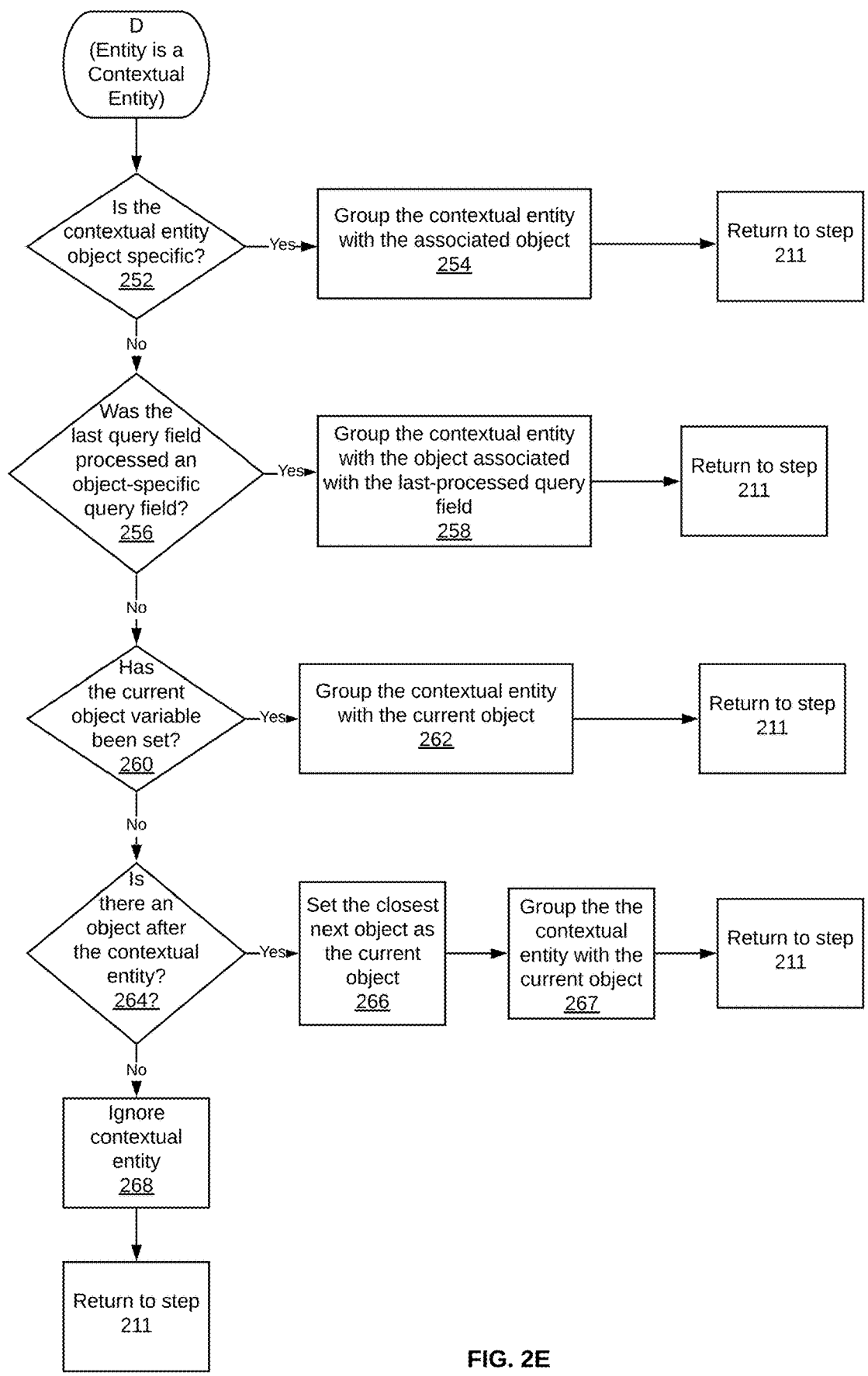
Figure 2F:
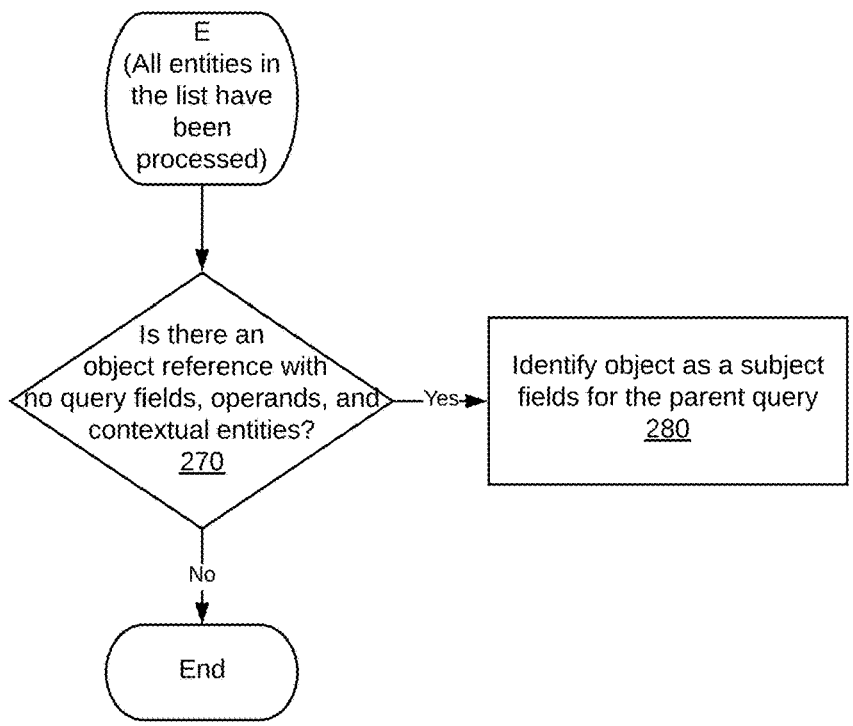

FIG. 1 illustrates an overview of the steps for converting a natural language query into single-object or nested database query. The system provides a natural language interface to a B2B application and receives a natural language query from a user for the B2B application (step 110). The natural language interface may be a text interface, a voice interface, an email interface, and/or any other interface in which a natural language query may be inputted into the system (e.g., any interface provided via an Internet-enabled device, such as desktop computer, laptop, mobile computing device, or embedded devices, etc.). For example, the user may text the system via a messaging interface or speak to the system via a voice interface. From the user perspective, the natural language interface appears as a bot or virtual agent that can be queried.

A natural language understanding (NLU) engine within the system applies an NLU model to the query to identify an intent and entities associated with the query (step 120). An NLU model is a set of rules and training data aimed to teach the NLU engine how to classify an incoming user utterance with respect to an intent and entities.

Figure 8:
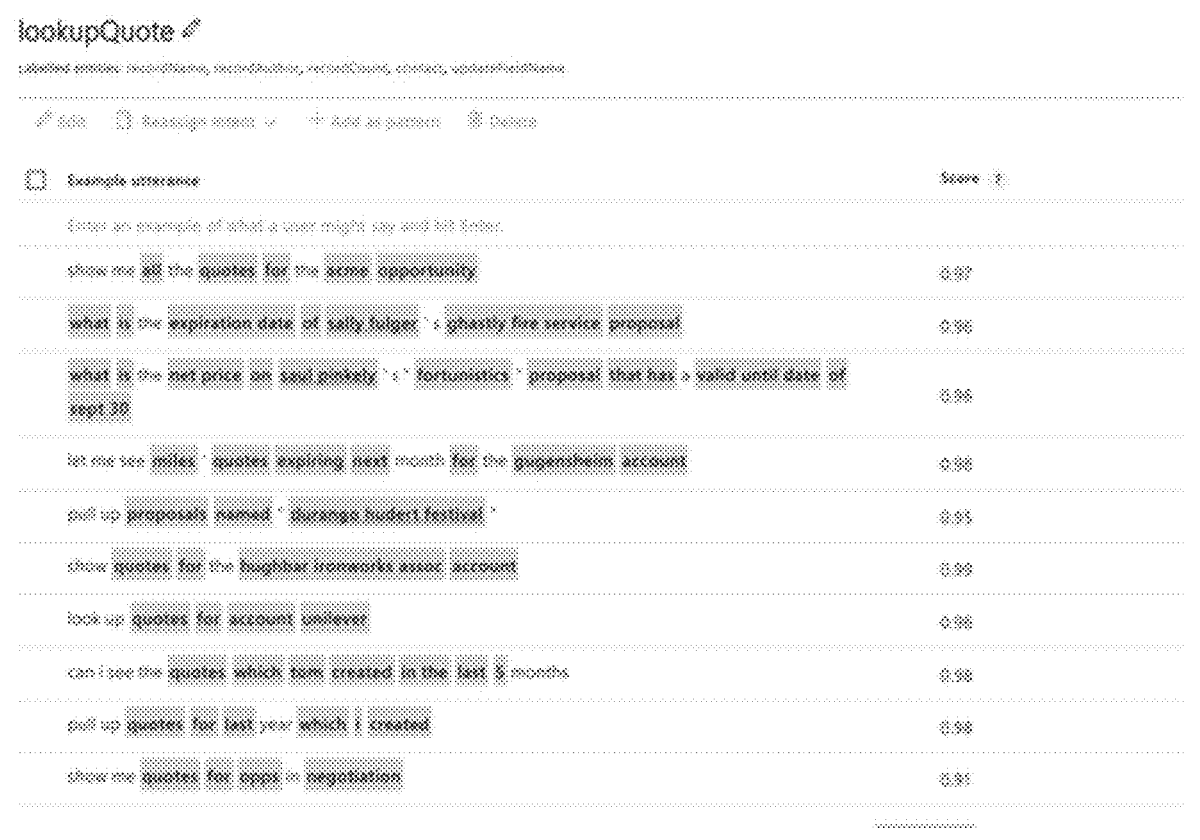

The intent is the action the NLU engine predicts that the user wants to take, for example, to look up a quote or retrieve certain agreements. The NLU model is trained to identify intents based on training queries labeled as corresponding to an intent. FIG. 8 is a screenshot that illustrate an example of queries used to train an NLU model to identify a "lookupQuote" intent. The intent corresponds to a database object (e.g., a database table). In this example, "Quote" is a database object.

The entities correspond to the parameters of the query. For each entity, the NLU engine outputs a standardized value for the entity and an entity type. The NLU model is trained to map various words and phrases in a natural language query to standardized values for entities. For example, the NLU may be trained to map the words "total value," "value," "amounts," "worth," "net worth," and "annual worth" to the entity value "amount."

Training phrases and words labeled with an entity type are used to train the NLU model to recognize entity types. The entity type associated with an entity allows the system to determine whether the entity is an object name, query field, operand, etc. and whether the entity requires further processing for purposes of determining how to handle the entity in a structured database query. In one embodiment, there are entity type tags for the following:

Object Name: Entities that correspond to a database object such as "agreements" or "quotes" are tagged as an object name.

Standard fields.
   Standard fields are queryable database fields that are common across a number of database objects. For example, in a business database with agreements and quotes, standard fields may include fields that specify the start date (e.g., "startDate"), the close date (e.g., "closeDate"), and the expiration date (e.g., "validUntilDate"), etc. of an agreement or quote. Queryable database fields are database fields that can be queried.

Object-Specific fields
   Object-specific fields are queryable database fields specific to a particular database object.

Filter Modifiers.
   Filter modifiers are entities that alter the count or order of the query results. For examples, these may include terms such as "last," "first," "full," "ascending," "descending," and "reverse."

Filter Operations
   Entities that are Boolean, comparison, and order by operators are labeled as a filter operation. Examples include "range," "greater," "lesser," "equal," "and," "or" "not," and "order by." Date, time, and currency entities.
   Entities that related to a date, a date range, and currency are tagged accordingly.

Record Count
   A record count entity is a contextual entity that identifies how many records should be returned.

Contextual entities
   A contextual entity is an operand for which the corresponding queryable field can be determined by the NLU model from the context of the query. A record name is an example of a contextual entity. For example, in the query "show me the Acme quote that I created last month," the entity "Acme" would be understood to be the value for a record name field the quote object. Contextual entities may be object specific. For example, assume that a "line item" object has a field called "forecast category" that is unique to the line item object, and one of the possible values for the field is "at risk." In that case, in the query "show me line items at risk," the entity "at risk" is an object-specific contextual entity corresponding to the "forecast category" field.

Interrogatives: Words such as "who," "what," and "when" are tagged as interrogatives. As discussed in more detail below, interrogatives enable the system to identify subject fields for a query.

Lookup Action: Phrases that indicate a request to lookup data, such as "tell me" and "show me," are lookup actions.

Conjunction: Connector and reverse-connector words in the query are labeled as conjunctions. Examples of words/phrases that are labeled as conjunctions are as follows:
   Connector: with, having, that have, that has, which have, whose, where, for which, that are (proceeding a possessive noun), for, on,
   Reverse connector: of, on, of the, and on the.

The table below illustrates an example of the tagged entity types and values for the phrase "Who created the top 3 Acme quotes from last year that are over $20 k that expire in the next 24 months and when?" in a B2B application that enables users to create quotes and agreements. This query is referred to herein as "the example query." The intent associated with the example query is to look up a quote (e.g., "lookupQuote")

TABLE 1

NLU Entities

| Phrase | Type | Value | StartIndex | EndIndex |
|---|---|---|---|---|
| Who | interrogative | Who | 0 | 2 |
| Created | standardField | createDateOrCreatedBy | 4 | 10 |
| Top | filterModifier | Top | 16 | 18 |
| 3 | recordCount | 3 | 20 | 20 |
| Acme | recordName | Acme | 22 | 24 |
| Quotes | objectName | Quote | 26 | 31 |
| from last year | builtin.datetimeV2.daterange | [object Object] | 33 | 46 |
| From | filterOperation | Range | 33 | 36 |
| Last | filterModifier | Last | 38 | 41 |
| Over | filterOperation | Greater | 57 | 60 |
| $20 k | builtin.currency | 20000 | 62 | 65 |
| Expire | agreementStatus | endDate | 72 | 77 |
| Expire | quoteField | validUntilDate | 72 | 77 |

TABLE 1-continued

NLU Entities

| Phrase | Type | Value | StartIndex | EndIndex |
|---|---|---|---|---|
| in the next 24 months | builtin.datetimeV2. daterange | 2019 Oct. 20 to 2021 Oct. 20 | 79 | 99 |
| When | interrogative | When | 105 | 108 |

The system identifies the candidate query fields, operands, conjunctions, contextual entities, and object names in the query from the tagged entities (step 130). Standard fields, object-specific fields, and filter modifiers are categorized as candidate query fields. Filter operation and date/time/currency entities are categorized as candidate operands. In certain embodiments, entities tagged with record count or an object-specific contextual entities are treated as operands for purposes of evaluating conditional parameters of a query.

The tables below illustrates an example of how the system would identify object names, candidate query fields, operands, and contextual entities from the tagged entities in Table 1:

TABLE 2a

Object Names

| Phrase | Type | Value | StartIndex | EndIndex |
|---|---|---|---|---|
| Quotes | objectName | Quote | 26 | 31 |

TABLE 2b

Candidate Query Fields

| Phrase | Type | Value | StartIndex | EndIndex |
|---|---|---|---|---|
| Created | standardField | Createdby OR createdDate | 4 | 10 |
| Top | filterModifier | Top | 16 | 18 |
| Last | filterModifier | Last | 38 | 41 |
| Expire | quoteField | validUntilDate | 72 | 77 |

TABLE 2c

Candidate Operands

| Phrase | Type | Value | StartIndex | EndIndex |
|---|---|---|---|---|
| 3 | recordCount | 3 | 20 | 20 |
| From | filteroperation | From | 33 | 36 |
| Over | filteroperation | Greater | 57 | 60 |
| From last year | Builtin.datetimeV2. daterange | 2018 Jan. 1 to 2018 Dec. 31 | 33 | 46 |
| In the next 24 months | Builtin.datetimeV2. daterange | 2019 Oct. 20 to 2021 Oct. 20 | 79 | 99 |
| $20k | Builtin.currency | $20k | 62 | 65 |

TABLE 2d

Contextual Entities

| Phrase | Type | Value | StartIndex | EndIndex |
|---|---|---|---|---|
| 3 | recordCount | 3 | 20 | 20 |
| Acme | recordName | Acme | 22 | 24 |

In Table 2b, the candidate query fields are the entities from Table 1 that are tagged as a standard field ("created"), an object-specific field ("expire"), or a filter modifier ("top" and "last"). In Table 2c above, the operands are the entities from Table 1 that are tagged as filter operations ("from," "over"), currency ("$20 k"), or a date range ("from last year," "in the next 24 months"). When matching candidate query fields to operands for the purposes of a conditional expression for the query (as discussed below), the system may treat contextual entities as operands.

In processing the tagged entities, the system then determines if there are valid references to two or more database objects in the query (step 135). A database object may be referenced explicitly, indirectly, or implicitly. Therefore, determining whether there are valid references to two or more database objects includes determining whether an explicit reference should be counted and whether there are any indirect or implicit references to a database object.

An entity tagged by the NLU engine as an object name is considered an explicit reference to a database object. In processing an entity tagged as an object name, the system determines if the object name is subsumed by another database object reference, a contextual entity, or a query field reference. An object name is considered subsumed by another object reference if it is included as part of a larger object reference, such as when two object names appear in a row (see Example #2 below). An object name is considered subsumed by a contextual entity if the object name is included in a larger contextual entity (e.g., see Example #3 below). Likewise, an object name is considered subsumed by a query field if it is part of a larger query field reference (see Example #4 below). If an object name is subsumed by a contextual entity, another database object reference, or a query field reference, the system does not consider the object name to be a valid reference to a database object for purposes of step 135. If the object name is not subsumed by a contextual entity, another database object reference, or a query field reference, then the system concludes that the object name is a valid reference to a database object for purposes of step 135. Below are examples of some queries and how the system handles the explicit database object references in one embodiment. For purposes of these examples, assume that the database includes the following objects: "quotes," "agreement," "line items," "opportunities," "approvals," and "contacts."

1. Example #1
Query: "Show me opportunities for line items closing soon"
Entities tagged as object names: "opportunities" and "line items."
Contextual Entities: None
Results after processing: Neither of these references is subsumed by a contextual entity or another database object reference. Therefore, there are valid references to two database objects in the query.

2. Example #2
Query: "Show me quote line items"
Entities tagged as object name: "quote" and "line items."
Contextual Entities: None
Results after processing: Since "quote" appears immediately prior to "line item," "quote" is part of "line item" and not a reference to the "quote" object.
Therefore, for purposes of step 135, there is only one valid reference to a database object, namely "line item."

3. Example #3:
Query: "Show me the line items for the Acme quote."

Entities tagged as an object name: "line items" and "quote."

Contextual entities: "Acme quote" (a record name).

Results after processing: "Quote" is subsumed by the larger contextual entity "Acme quote." Therefore, "line item" is the only valid database object reference in the query.

4. Example #4:

Query: "Help me find quotes whose approval stage is generated."

Entities tagged as an object name: "quotes" and "approvals." (Note: In this example, "approval stage" is a field in the "quotes object")

Results after processing: Since "approval stage" is a field in the quotes object, the object reference "approvals" is subsumed by the larger field reference "approval stage." Therefore, the only valid explicit database object reference in this query is "quotes."

The system is configured to also identify indirect or implicit references to database objects. In one embodiment, the system is configured to recognize certain contextual entities as valid indirect or implicit references to a database object. Certain contextual entities that are a type of database object are treated as indirect (and valid) references to a database object. For example, assume a database has an "agreement" object, an NDA is a type of agreement in the system, and the system receives the query, "show me the NDAs created for Acme." In such case, the "NDA" mention is an indirect reference to the agreement object, and therefore, the system would treat it as a valid reference to a database object.

A contextual entity may also be an implicit database object reference. In one embodiment, the system is configured to treat contextual entities that immediately follow a lookup entity (e.g., "look up," "show me," etc.) and that are instances of a database objects as a valid, implicit database object reference. For example, assume a database has a "contact" object and the system receives the query, "look up John Smith." In this case, the "John Smith" mention is an implicit mention to the "contact" object, and the system would treat it as a valid reference to the "contact" database object.

If there is only one valid reference to a database object in the user's query, the system proceeds with steps to create a single-object query. If there are valid references to two or more database objects in the query, the system proceeds with steps to create a nested database query that has a parent database object and one more child database objects.

1.1 Creating a Single-Object Query

If there is only one valid reference to a database object in the user's query, the system evaluates the candidate query fields and operands all together to identify any subject fields, conditional expressions, record count limit, and ordering/sorting criteria for the query (step 140). The system creates a query plan with the results of such evaluation and then generates a single-object database query based on the query plan (steps 145, 150). A method for evaluating the tagged entities to create a query plan is described with respect to FIG. 4.

In creating the database query, the system maps query fields in the query plan to actual database fields using a simple mapping of query field values to database fields. For each query field in the query plan, it then creates the applicable expression/statement within the database query using the applicable database field and the corresponding operand and operator associated with the query field. For each query field corresponding to a conditional expression, the system creates a simple condition for the database query using the mapped database field and corresponding operator and operand. All the simple conditions are combined for the actual conditional expression in the database query (e.g., all the where clause conditions are ANDed with each other to form an actual WHERE clause).

1.2 Creating a Nested Database Query

In a nested query, the database object associated the intent is the parent object and the other database object(s) are child objects in the conditional clause of the parent query. Therefore, it is important that the system accurately ascertain the intent of the query in order to correctly nest the database queries. If the NLU model is trained using more data for one intent than another, the NLU model may be biased towards the intent with more data. Consequently, if there are valid references to two or more database objects in the query, the system determines if the intent identified by the NLU engine is correct and self-corrects the intent as necessary (step 155). An example of a method for performing this step is described with respect to FIG. 3.

The system then determines whether the query can be written as a single-object query despite having valid references to multiple database objects (step 160). Specifically, if there are valid references to two database objects, the system determines if the child object effectively translates to a field for the parent object. In one embodiment, the database object "accounts" translates to field in a number of other database objects. For example, the query "show me agreements under Acme accounts" is the same as "show me Acme agreements" and can be converted into a single-object query. If the query can be written as a single-object query, the system proceeds with creating a single-object query plan for the query, treating the child object as a candidate query field (step 165).

If the query cannot be written as a single-object query, the system determines which candidate query fields, operands, and contextual entities pertain to each valid database object reference in the query. In other words, the system groups candidate query fields, operands, and contextual entities in the query by valid database object reference (step 170). In one embodiment the system groups the candidate query fields, operands, and contextual entities as follows:

an object-specific query field and the immediately following operand are grouped with the database object corresponding to the object-specific field;

an object-specific contextual entity is grouped with the database object corresponding to the object-specific contextual entity; and each remaining entity (candidate query field, operand, or contextual entity) is grouped based on the location of entity relative to the database object references and one or more "transitions" in the query.

A transition is a conjunction separating one object name and its related query fields and operands from another object. In one embodiment, the system treats a conjunction meeting the following criteria as a transition:

The conjunction is between two valid database object references; and

There is no other conjunction between the conjunction being evaluated and the database object reference to the right of this conjunction. Example:

"Show me line items that have an account value of over $500 k for my closing opportunities."

In this example, "line items" and "opportunities" are the database objects referenced in the query.

In this query, "that have" is a mere conjunction and not a transition. It has an object to its left (i.e., "line items"), but there is another conjunction (i.e., "for") between it and the object on the right (i.e., "opportunities").

The conjunction "for" is also a transition as it is between two object references (i.e., "line items" and "opportunities") and there is no other conjunction between it and the object on its right, namely "opportunities."

A method for grouping candidate query fields, operands, and contextual entities with the applicable objects is described in more detail with the respect to FIG. 2.

After creating the groups, the system evaluates the candidate query fields and operands in each group separately to identify any subject fields, conditional parameters, record count limit, and ordering/sorting criteria for each group (step 175). The system creates a separate query plan for each group with the results of the evaluation of each group (step 180). As stated above, a method for evaluating candidate query fields and operands to create a query plan is described with respect to FIG. 4.

The system then creates a nested database query based on the query plan for each group, where a database query is created for each group (step 190). The database object corresponding to the intent is the parent database object, and the system generates the parent query (i.e., the highest-level query) from the group associated with the parent database object. The database queries corresponding to the other groups are "child queries" that are inserted into the conditional parameters of the parent query (e.g., inserted into a WHERE clause in SQL), thus creating a nested database query. The child queries are combined in a conditional clause with any conditional parameters identified in the parent group.

Figure 9:
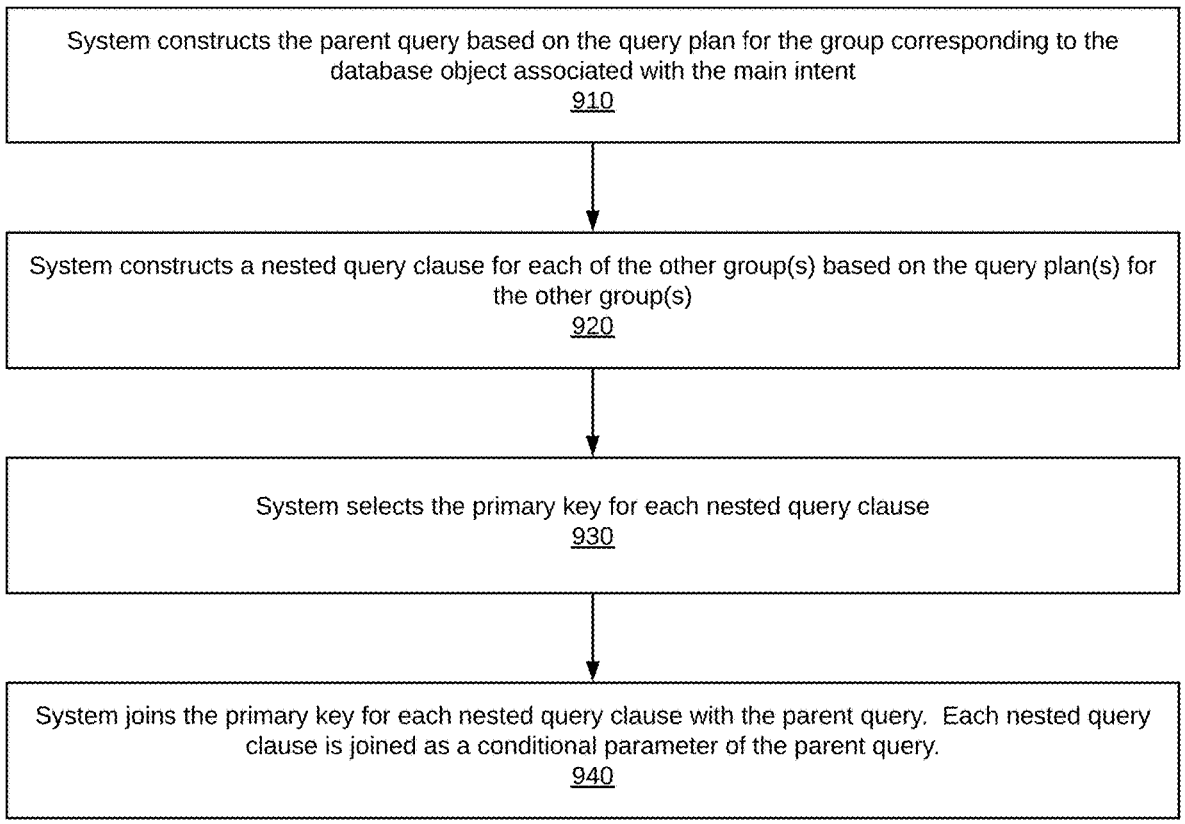
FIG. 9 is a flowchart that illustrates a method for creating a nested database query based on a plurality of query plans corresponding to multiple database object references.

A method for creating a nested database query based on the query plan for each group is described in more detail with respect to FIG. 9. The system constructs the parent query based on the query plan for the group corresponding to the main intent of the user's query (step 910). The main intent is the intent identified by the NLU in step 120 or corrected in step 155. For example, suppose the user query is "lookup quotes over $20 k for Dan's opportunities," where "quotes" and "opportunities" are database objects. The user's main intent is to lookup quotes, and the parent query in SQL is "SELECT*from Quote WHERE Net-Price>20000."

The system constructs a nested query clause for each of other group(s) (step 920). In the above example, the nested query clause is "SELECT Id FROM Opportunity WHERE OwnderID='dan'. The system selects the primary key for each nested query clause and joins the primary key with the parent query (steps 930, 940). The nested query clause is joined as conditional parameter of the parent query. For example, in a SQL query the nested query clause is joined as a WHERE clause. In certain embodiments, order by and record count statements in the nested query clauses are stripped out before joining the nested query clause with the parent query.

2. Method for Grouping Candidate Query Fields, Operands, and Contextual Entities by Object Name FIG. 2 illustrate a method for grouping candidate query fields, operands, and contextual entities in the query with the applicable valid database object reference in the query.

Referring to FIG. 2, the system identifies all conjunctions in the query from the tagged entities (step 202), and disregards any conjunctions subsumed by a contextual entity (step 204).

The system then identifies the conjunctions that are transitions (step 206). As stated above, in one embodiment, the system treats a conjunction meeting the following criteria as a transition:
- The conjunction is between two valid database object references; and
- There is no other conjunction between the conjunction being evaluated and the database object reference to the right of this conjunction.

The system aggregates valid object references (e.g., lineItem, opportunity), conjunctions (e.g., that have, for, on the), query fields (e.g., ACV, closeDate), operands (e.g., next year, $500 k+), and contextual entities into one list (step 208), and sorts the list based on start index of each of the entities so that they appear in sequential order (step 210).

The system scans the sorted list, and processes each entity in the list in order of start index as follows:

If the entity is a valid reference to a database object (e.g., an object name not subsumed by a contextual entity), the system sets the object name as "the current object" and continues to the next entity in the list (steps 212-214). The current object is a variable the system uses in grouping candidate query fields, operands, and contextual entities. The current object variable is initially set to NULL until the system "sets" the current object by changing the value of the variable to an object name.

If the entity is a non-transition conjunction, the system proceeds to the next entity in the list (step 216).

If the entity is a transition, the system peeks forward and identifies the next valid object reference on the list and sets that object as the current object (i.e., sets the value of the current object variable to the object's name) (steps 218-220). The system then proceeds to the next entity in the list.

If the entity is a candidate query field (step 222), the system performs the following:
- If the candidate query fields is an object-specific field and if the associated object is mentioned in the user query (and valid), the system groups the candidate query field with the associated object and proceeds to the next entity (steps 224-226).
- Otherwise, if the current object variable has been set, the system groups the candidate query field with the current object (i.e., with the object name to which the current object variable has been set), and then proceeds to the next entity (228-230).
- If current object variable has not been set, the system peeks forward and determine if there is another object name after the candidate query field (step 231). If so, the system set the closest next object as the current object (step 232), and groups the candidate query field with this object (step 233). The system then proceeds to the next entity.
- If no following object is found (i.e., the object is implicit), this is likely an error condition. The system ignores the candidate query field, and proceeds to the next entity (step 234).

If the entity is an operand (step 236), the system perform the following:
- If the last candidate query field processed was an object-specific query field, the system groups the operand with the object associated with this candidate query field, and proceeds to the next entity (step 238-240).
- Otherwise, if a current object variable has been set, the system groups the operand with the current object (i.e., with the object name to which the current object has been set), and proceeds to the next entity (steps 242-244).

If the current object variable has not been set, the system peeks forward and determine if there is another valid database object reference after the operand (step 246). If so, it sets the closest next object as the current object (step 248), and group the operand with this object (step 249). The system proceeds to the next entity.

If no following database object is found (i.e., the object is implicit), this is likely an error condition. The system ignores the operand, and proceeds to the next entity (step 250)

If the entity is a contextual entity (and not an implicit/indirect reference to a database object), the system performs the following:

If the contextual entity is an object-specific field and if the associated object is mentioned in the user query (and valid), the system groups the contextual entity with the associated object and proceeds to the next entity (steps 252-254).

Otherwise, if the last candidate query field processed was an object-specific field, the system groups the contextual entity with object associated with this query field, and proceeds to the next entity (256-258).

Otherwise, if the current object variable has been set, the system groups the contextual entity with the current object (i.e., with the object name to which the current object has been set), and then proceeds to the next entity (260-262).

If current object variable has not been set, the system peeks forward and determines if there is another object name after the contextual entity (step 264). If so, the system set the closest next object as the current object (step 266), and groups the contextual entity with this object (step 267). The system then proceeds to the next entity.

If no following object is found (i.e., the object is implicit), this is likely an error condition. The system ignores the contextual entity, and proceeds to the next entity (step 268).

If, after all the candidate query fields, operands, and contextual entities in the list have been processed, there is a valid database object reference with no candidate query fields, operands, or contextual entities, then the system identifies this database object reference as a subject field in the parent query (step 270-280).

Below are examples of entities and groupings for natural language queries with a plurality of independent object names:

A. Natural Language Query: "Show me line items that have an ACV of more than $500 k and closing for opps that are past due."
Objects: opportunity (opps), lineItem
Conjunctions: that have, for
Transitions: for
Query Fields/Operands grouped with lineItem: ACV>=$500 k, closeDate=Soon
Query Fields/Operands grouped with opps: Past Due
Corresponding Database Query:
SELECT*FROM opportunityLineItems WHERE acv>=500000 and closxeDate>=today AND closeDate<=[30 days from now] AND opportunityId IN (SELECT Id FROM Opportunity WHERE closeDate<today) ORDER BY LastModifiedDate DESC LIMIT 21

B. Natural Language Query: "Show me line items that have an ACV of more than $500 k for my past due opps over $500 k."

Objects: opportunity (opps), lineItem
Conjunctions: that have, for
Transitions: for
Query Fields/Operands grouped with lineItem: ACV>=$500 k
Query Fields/Operands grouped with opps: my, past due, >=$500 k
Corresponding Database Query:
SELECT*FROM opportunityLineItems WHERE acv>=500000 AND opportunityId IN (SELECT Id FROM Opportunity WHERE closeDate<today AND owner=[logged in user] AND TCV>=500000) ORDER BY LastModifiedDate DESC LIMIT 21

C. Natural Language Query: "What is the start date, close date, ACV of the maas360 lineItem on my expiring Acme quote?"
Objects: quote, lineItem
Conjunctions: of the, on
Transitions: on
Query Fields/Operands grouped with lineItem: start date, close date, ACV (note: upon evaluation, the system would identify these as subject fields).
Query Fields/Operands grouped with quote: my, expiring (also, the contextual entity "Acme" would be grouped with quote.) Corresponding Database Query:
SELECT*FROM quoteLineItems WHERE productName="maas360" AND quoteId IN (SELECT Id FROM Quote WHERE endDate>today AND endDate<[30 days from now] AND Owner=[logged in user] AND (name='Acme' or accountName='Acme')) ORDER BY LastModifiedDate DESC LIMIT 21

3. Method for Self-Correcting the Intent associated with the Query.

Figure 3:
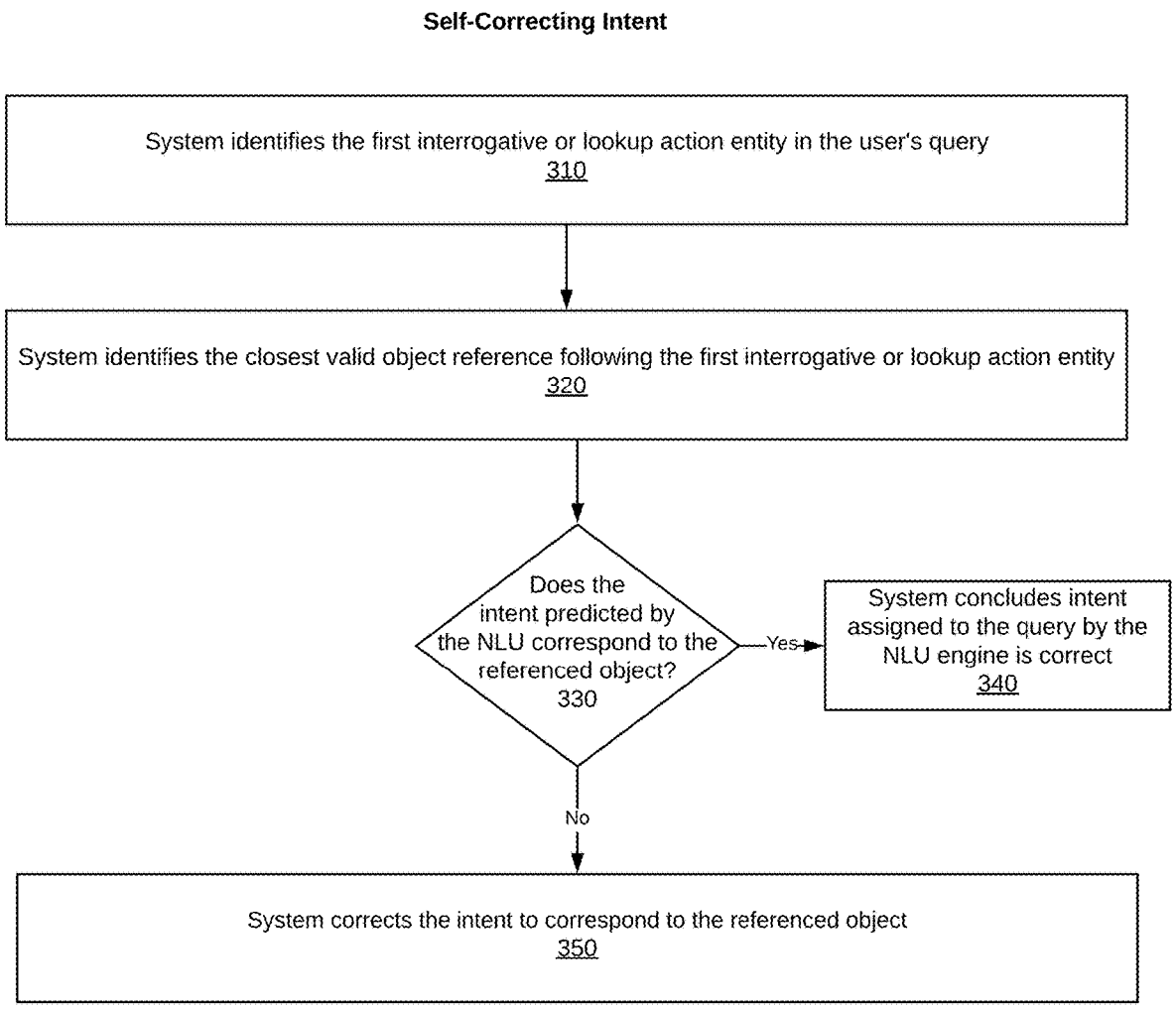
FIG. 3 is a flowchart that illustrates a method, according to one embodiment, for determining if the intent identified by the NLU engine is correct and for self-correcting the intent as necessary.

FIG. 3 illustrates a method for determining if the intent identified by the NLU engine is correct and for self-correcting the intent as necessary. As described with respect to step 150 in FIG. 1, this step is performed in response to the system determining that there are two or more independent objects in the query.

Referring to FIG. 3, the system finds the first interrogative or lookup action in the user query and identifies the closest of the valid database object references to follow that interrogative or lookup action (steps 310, 320). The system determines if the intent identified using the natural language model corresponds to the identified database object reference (step 330). If so, the system concludes that the intent assigned to the query by the NLU engine is correct (step 340). If not, the system concludes that the intent assigned by the NLU engine is incorrect and corrects the intent to correspond to said closest database object reference (step 350).

4. Evaluating Candidate Query Fields and Operands to Create a Query Plan

Figure 4:
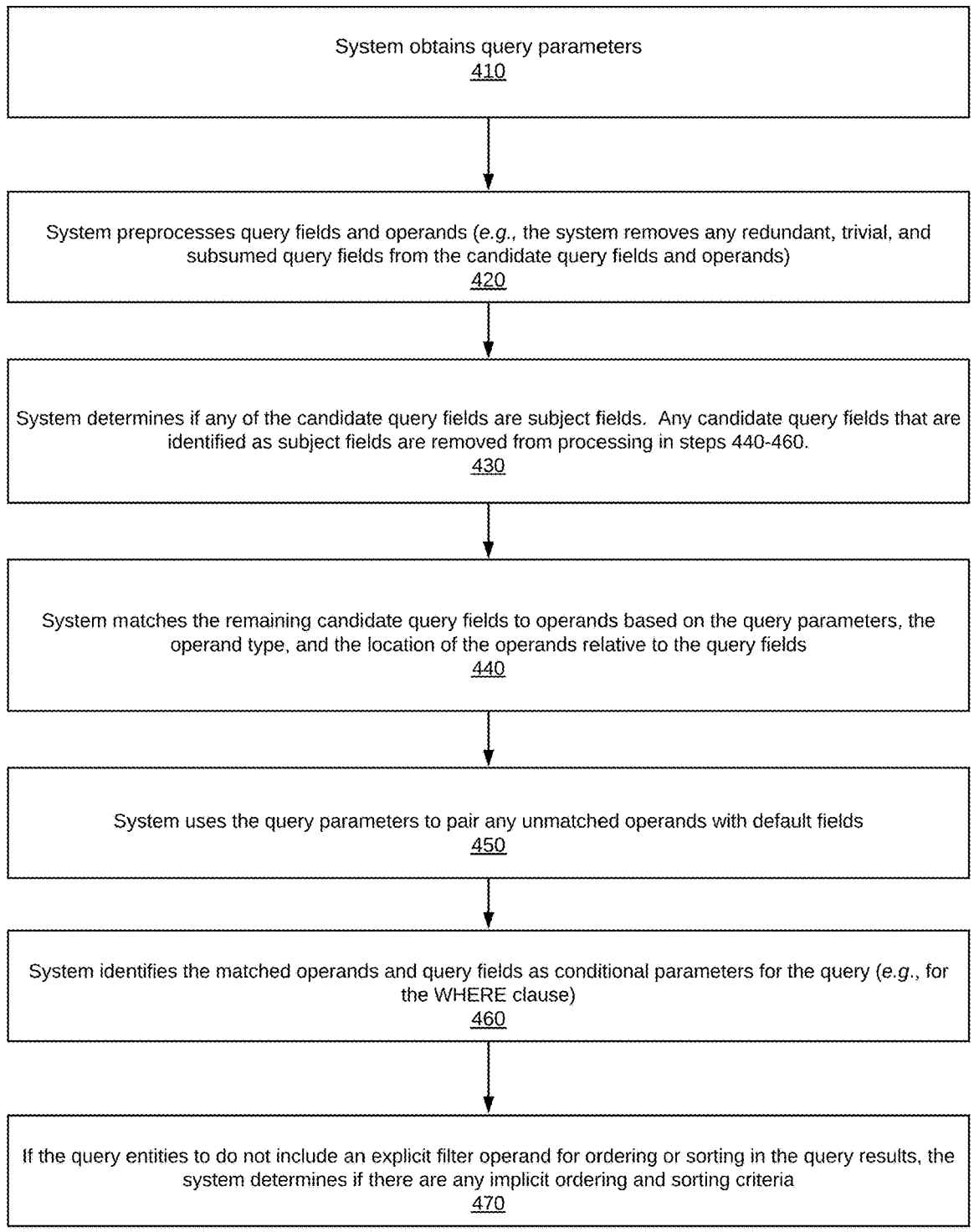
FIG. 4 is a flowchart that illustrates a method, according to one embodiment, for creating a query plan for a single-object query or for a group in a multi-nested query.

FIG. 4 illustrates a method for evaluating candidate query fields and operands to identify any subject fields, conditional parameters, record count limit, and ordering/sorting criteria for a query. The method is performed to create a query plan for the query as a whole (in the case of single-level queries) or for a group in the case of a nested query. For a nested-level query, this method is performed separately for each group in the query (i.e., the candidate query fields and operands are evaluated separately for each group).

4.1 Obtaining Query Parameters

In order to know how to process the candidate query fields and operands, the system obtains query parameters, including object-specific query parameters (where the object is the database object associated with the query as a whole or with the group, whichever is applicable) (step 410). The query parameters include specifications for standard fields and object-specific fields, as well as default fields for operand types. The specifications for a standard or object-specific query field may include the operand type accepted by the query field, whether the query field is a default field for the operand type, any matching rules for the query field (e.g., "match only to operands to the right of the query field"), and whether the query field is ambiguous. For example, the query parameters would specify that the field "validUntilDate" takes a date operand.

An ambiguous query field is one in which the entity associated with the field can map to two or more fields. For example, the entity "created" could be associated with the "createdBy" field in a database or the "createdDate" field in the database, depending on whether the user is referring to a person or a date.

In one embodiment, the query parameters are determined by a developer of the system, and the system accesses the applicable query parameters from a list or library of query parameters. In one embodiment, query parameters are defined for each database object.

4.2 Preprocessing Fields and Operands

The system preprocesses or "cleans up" the candidate query fields and operands to prepare them for further processing (step 420). For example, the system may preprocess the fields and operands by removing any redundant, trivial, and subsumed query fields and operands from the candidate query fields and operands. In one embodiment, this comprises the following steps:

- System sorts query fields and operands based on start index.
- If one operand is a superset of another operand, the system subsume the smaller one.
- If one operand is a superset of a query field, the system subsumes the smaller query field.

For example, in the example query above, the word "from" is subsumed by the phrase "from last year." The word "last" is also subsumed by the phrase "from last year." Therefore, the system remove "from" from the list of operands to be processed and "last" from the list of query fields to be processed. Therefore, for purposes of the example query, this leaves the following query fields and operands for further processing:

TABLE 3a

Candidate Query Fields

| Phrase | Type | Value | StartIndex | EndIndex |
|---|---|---|---|---|
| Created | standardField | created | 4 | 10 |
| Top | filterModifier | top | 16 | 18 |
| Expire | quoteField | validUntilDate | 72 | 77 |

TABLE 3b

Operands

| Phrase | Type | Value | StartIndex | EndIndex |
|---|---|---|---|---|
| 3 | recordCount | 3 | 20 | 20 |
| From last year | Builtin.datetimeV2.daterange | 2018 Jan. 1 to 2018 Dec. 31 | 33 | 46 |
| Over $20k | filteroperation builtin.number | Greater $20k | 57 62 | 60 65 |
| In the next 24 months | Builtin.datetimeV2.daterange | 2019 Oct. 20 to 2021 Oct. 20 | 79 | 99 |

4.3 Identify any Subject Fields of the Query Based on Interrogatives

The system determines if any of the candidate query fields are "subject fields" (step 430). Subject fields are fields from which values will be returned to the user. For example, in a SQL query the subject fields are the fields in a SELECT statement. In one embodiment, the system determines if any of the candidate query fields are subject fields based on whether there are any queryable fields between an interrogative or lookup action entity in the query. A method for identifying the fields that are the subject of the query are described in more detail below with respect to FIG. 6.

Figure 6:
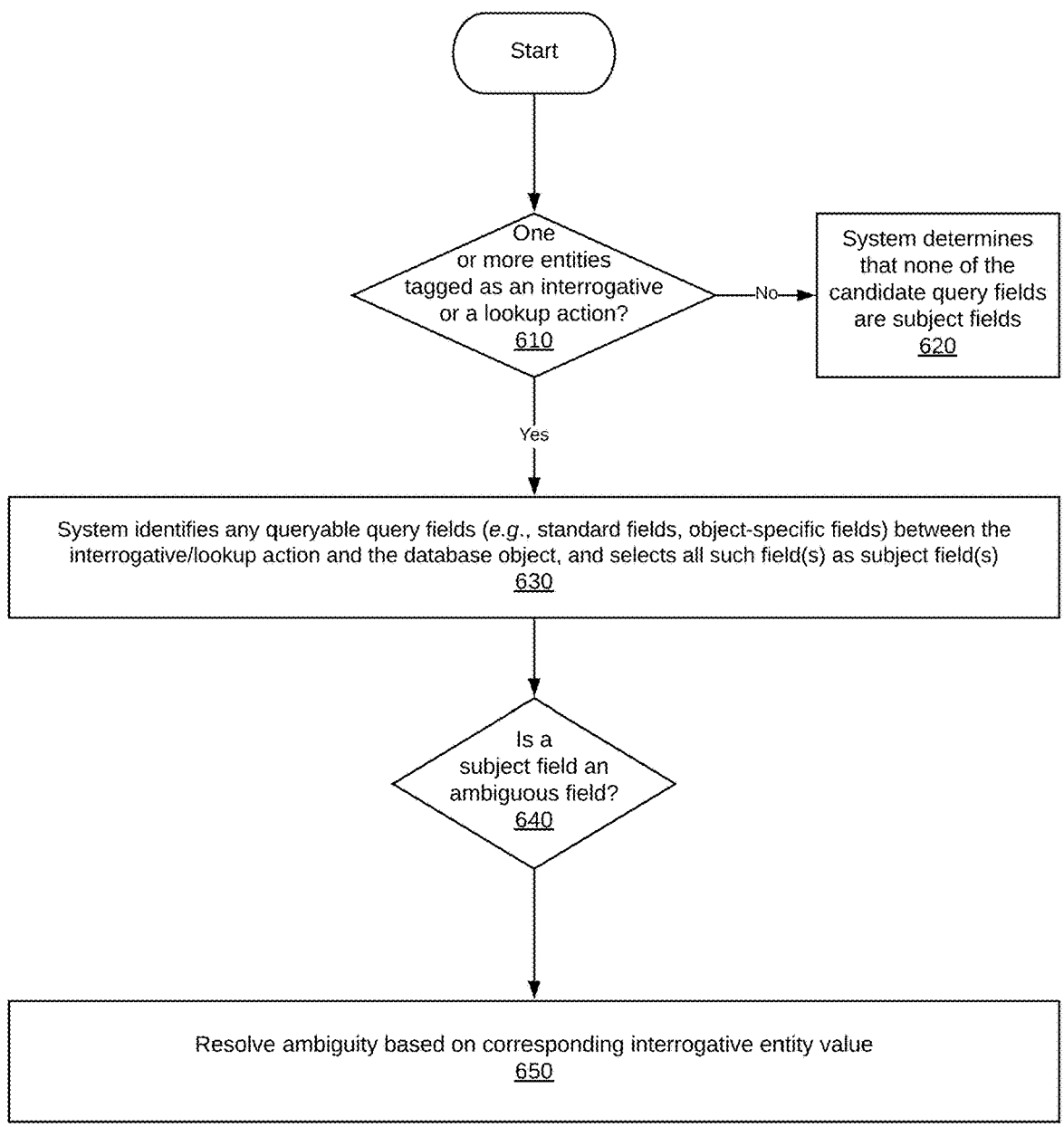
FIG. 6 is a flowchart that illustrates a method, according to one embodiment, for identifying which of the candidate query fields are the subject fields.

In the example query above, the system identifies both "createdBy" and "createdDate" as being subject fields due to the interrogatives "who" and "when" in the natural language query (see discussion related to FIG. 6). Consequently, the system adds the following subject fields to the query plan:

TABLE 4

Subject Fields

| Phrase | Type | Value | StartIndex | EndIndex |
|---|---|---|---|---|
| created | standardField | created By | 4 | 10 |
| created | standardField | createdDate | 4 | 10 |

For some user queries, subject query fields will not be identified at this stage and will not appear in the query plan, such as the case when the user is asking for instances of a database object. For instance, in the query, "show me the last 5 agreements I created," the user is asking the system for electronic copies of certain agreements. Therefore, among candidate query fields and operands for this query, there are no subject fields. Instead, the system inserts the applicable default subject field(s) when creating the database query from the query plan. In other words, if the user does not explicitly reference a subject field, the system retrieves a configure list of default field(s) based on the database object.

4.4 Matching Remaining Query Fields and Operands

At this point the database object and the subject fields (if any) have been identified for either a group or a query as a whole, whichever is applicable. For a SQL query this means that the database object for the FROM statement and the database fields (if any) for the SELECT statement have been identified. Any remaining query fields and operands relate to other statements in a database query (or sub-query), such as a conditional expression (e.g., a WHERE statement), an ordering/sorting clause (e.g., an ORDERBY clause), and a limit on the number of records returned (e.g., a LIMIT statement).

In order to process the remaining query fields and operands for such clauses/statements, the system matches the remaining candidate query fields to operands based on the query parameters, the operand type of the operands (where the operand type of an operand is the entity type with which the operand is tagged by the NLU engine), and the location of the operands relative to the query fields (step 440). The query parameters are used to identify the operand type accepted by a query field, as well any specific matching rules pertaining to a query field or operand (e.g., certain fields may only match with operands appearing after the query field) An implementation of this step is described in more detail with respect to FIGS. 5A-B.

In the example query, the below candidate query fields are remaining after the subject fields have been removed:

TABLE 5

| | | Query Fields | | |
|---|---|---|---|---|
| Phrase | Type | Value | StartIndex | EndIndex |
| top | filterModifier | top | 16 | 18 |
| expire | quoteField | expire | 72 | 77 |

For the reasons set forth with respect to FIGS. 5A-B, the field "top" is matched to the operand "3," and the field "validUntilDate" is matched to the operand "in the next 24 months," as shown in the table below:

TABLE 6

| | | | Matched Query Fields and Operands | | |
|---|---|---|---|---|---|
| Type | Value | Operator | Operand1 | Operand2 | Operand Description |
| filterModifier | Top | Equal | 3 | — | Record count |
| standardField | validUntilDate | Range | 2019-10-20T07:00:00.000Z | 2021-10-20T07:00:00.000Z | expire in the next 24 months |

This would leave the following operands unmatched after step 440:

TABLE 7

| | Unmatched Operands | | | |
|---|---|---|---|---|
| Phrase | Type | Value | Startindex | Endindex |
| From last year | Builtin.datetimeV2. daterange | 2018 Jan. 1 to 2018 Dec. 31 | 33 | 46 |
| Over $20k | filterOperation builtin.number | Greater $20k | 57 62 | 60 65 |

If any unmatched operands are remaining after step 440, than the fields corresponding to these operands in the user's query must be implicit. The query parameters specify default fields for operand types, and the system uses the query parameters to pair unmatched operands with default fields (step 450). Filter operation operands are associated with the closest following operand-query field pair and used to determine the operator associated with the pair. In the example query, the filter modifier "over" is used to apply the "greater than" operator to the match between "$20 k" and "net price."

In the example user query, the unmatched operands in Table 7 would be matched as follow:

TABLE 8

| | | Default Field-Operand Matches | | | |
|---|---|---|---|---|---|
| Query Field Type | Query Field Value | Operator | Matching Operand1 | Matching Operand2 | Operand Description |
| standardField | createdDate | Range | 2018-01-01T07:00:00.000Z | 2018-12-31T07:00:00.000Z | from last year |
| standardField | netPrice | Greater | 20000 | — | over $20k |

"CreatedDate" is the default query field corresponding to "from last year." "NetPrice" is the default query corresponding to "$20 k."

The summary of the query field-operand matches from the example query are as follows:

TABLE 9

All Query Field-Operand Matches

| Query Field Type | Query Field Value | Operator | Matching Operand1 | Matching Operand2 | Operand Description |
|---|---|---|---|---|---|
| filterModifier | Top | Equal | 3 | — | Record count |
| standardField | validUntilDate | Range | 2019-10-20T07:00:00.000Z | 2021-10-20T07:00:00.000Z | expire in the next 24 months |
| standardField | createdDate | Range | 2018-01-01T07:00:00.000Z | 2018-12-31T07:00:00.000Z | from last year |
| standardField | netPrice | Greater | 20000 | — | over $20k |

The system adds the matched operands and query fields to the query plan as conditional parameters for a query (e.g., for the WHERE clause) (step 460). In one embodiment, contextual entities are added to the conditional parameters of a query, even if they are not part of the matching process above. For example, "recordName=Acme" may be added to the conditional parameters for the example query in the query plan. The contextual entities may be added to the conditional parameters in making the query plan or when the system generates a query based on the query plan.

The system associates certain filter modifiers, such as "top," or "last," with a record count limit, and adds the record count limit to the query plan. They may be paired with a default record count operand or an explicit record count contextual entity (e.g., "3" in the example above).

4.5 Identify any Implicit Sorting or Ordering Parameters for the Query

If the query entities to do not include an explicit filter operand for ordering or sorting in the query results, the system determines if there are any implicit ordering and sorting criteria (step 460). In one embodiment, this comprise the following:

The system determines if any of the query fields in the conditional expression take a date range. If so, the system adds an order by entity to the query plan, specifying that results should be ordered based on the value of the query field. The system adapts the ordering results based on the query to ensure records that have immediate time significance are placed ahead of less-immediate records based on the nature of the query. For example, if a user asks for objects expiring next quarter, the results will be returned in ascending order based on expiration date, so that the first-to-expire object will be listed first. If the user asks for objects expiring last quarter, the results will be returned in descending order based on expiration date, so that the most recently expired object will be listed first.

The system determines if the query includes entities such as top, highest, lowest. etc. If so, the system specifies the matching query field (explicit or default) in the order by criteria.

The system adds any identified ordering/sorting criteria to the query plan.

4.6 Example Query Plan

Below is a summary of the query plan for the example query.

Query Plan
Intent
lookupQuote

| | | Subject Fields | | |
|---|---|---|---|---|
| Phrase | Type | Value | StartIndex | EndIndex |
| created | standardField | created By | 4 | 10 |
| created | standardField | createdDate | 4 | 10 |

| | | | Conditional Statement | | |
|---|---|---|---|---|---|
| Query Field Type | Query Field Value | Operator | Matching Operand1 | Matching Operand2 | Operand Description |
| standardField | validUntilDate | range | 2019-10-20T07:00:00.000Z | 2021-10-20T07:00:00.000Z | expire in the next 24 months |
| standardField | createdDate | range | 2018-01-01T07:00:00.000Z | 2018-12-31T07:00:00.000Z | from last year |
| standardField | netPrice | greater | 20000 | — | over $20k |
| Contextual entity | recordName | equals | Acme | | Acme |

Sorting and Ordering
sortBy netPrice
Record Count

5. Example Method for Matching Candidate Query Fields to Operands

Figure 5A:
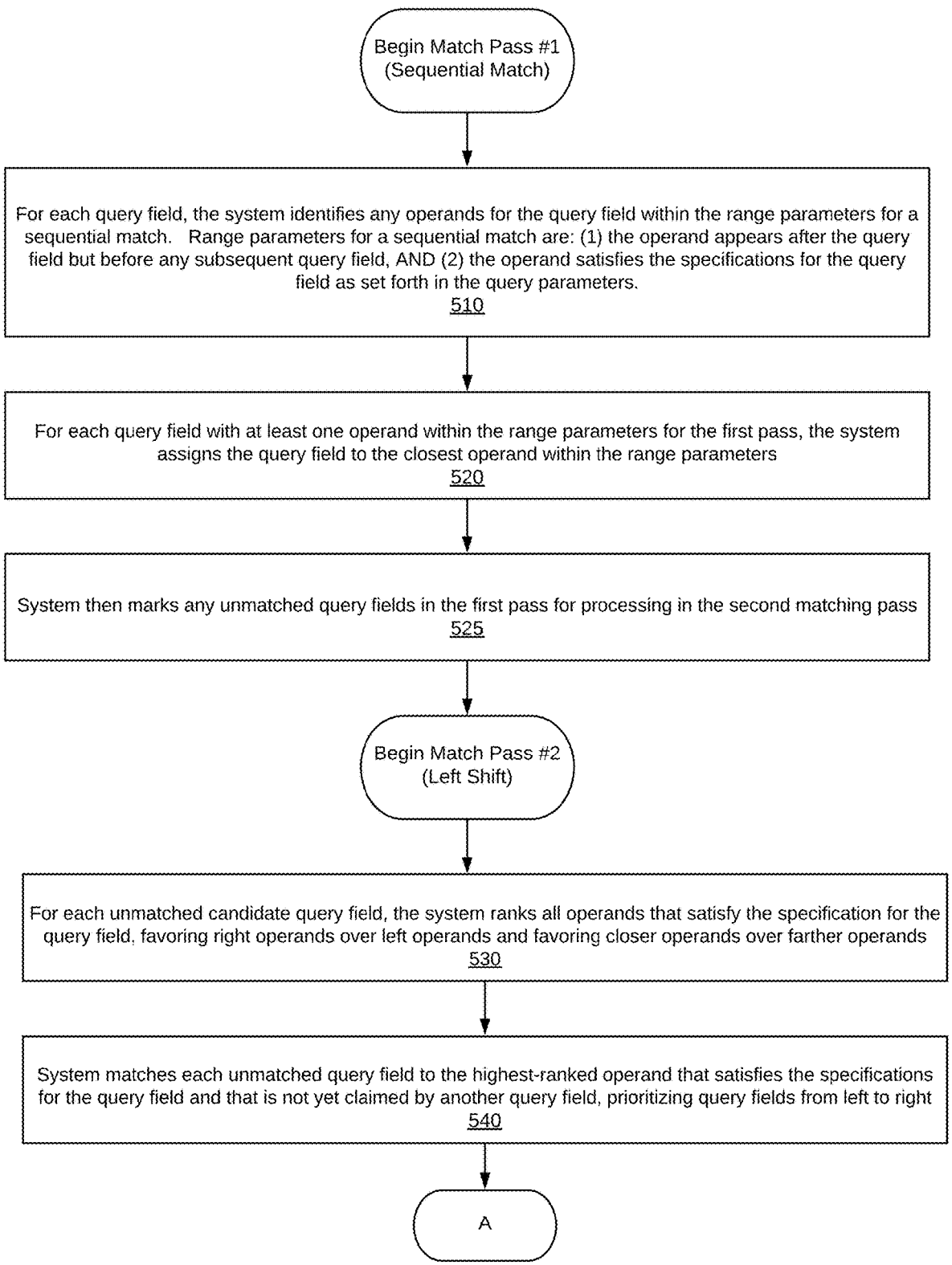
FIGS. 5A and 5B are flowcharts that illustrate a method, according to one embodiment, for matching candidate query fields to operands.
Figure 5B:
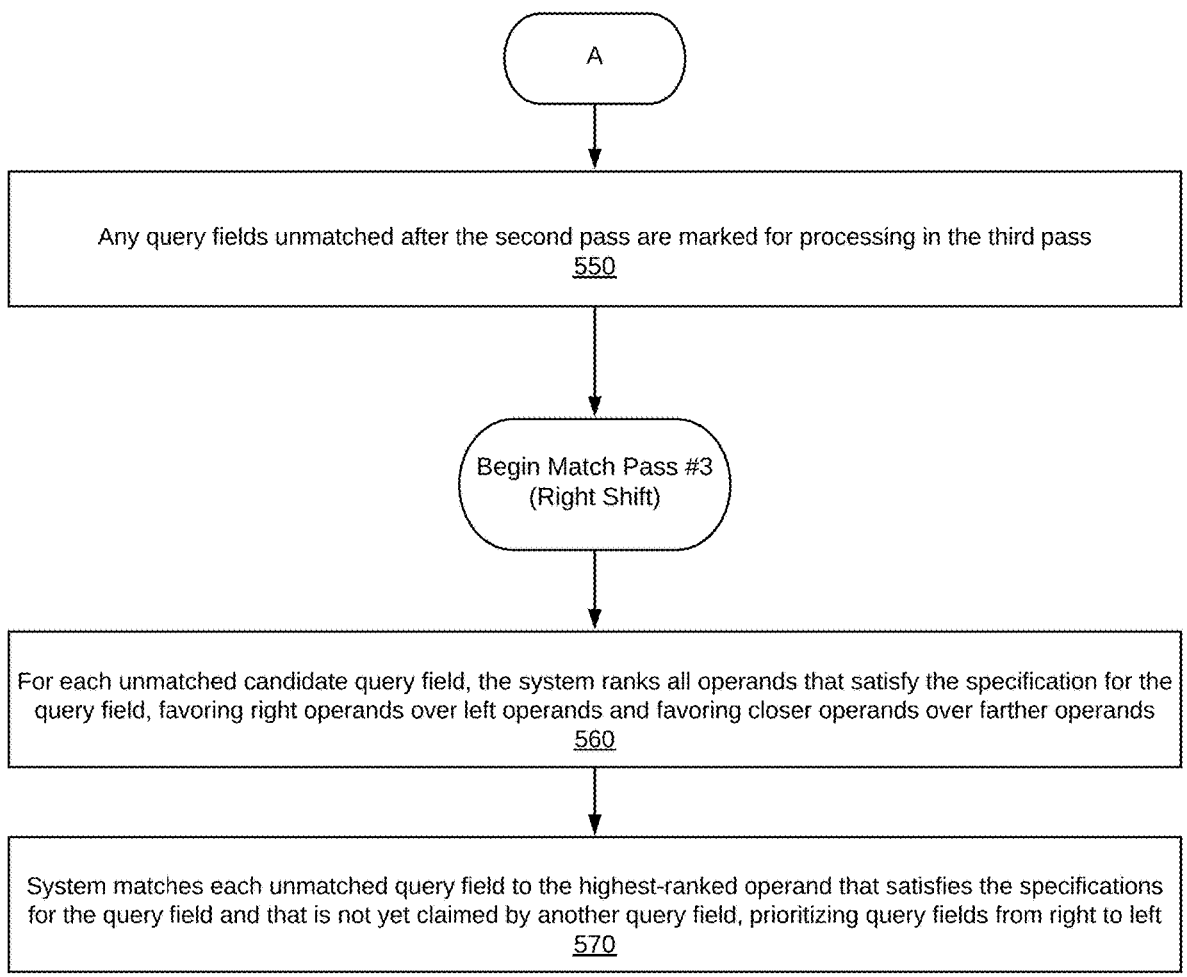

FIGS. 5A-5B illustrate an example method for matching candidate query fields to operands. This method includes three matching passes, referred to herein informally as "sequential match," "left pass," and "right pass."

5.1 Pass #1: Sequential Match

In matching query fields to operands, the most straight forward matches are when an operand of the correct type immediately follow a query field (e.g., "the top 3," or "expires in the next 24 months"). This is the idea behind the sequential match pass.

For each query field, the system identifies any operands for the query field within the range parameters for a sequential match (step 510). The range parameters for a sequential match are: (1) the operand appears after the query field but before any subsequent query field, AND (2) the operand satisfies the specifications for the query field as set forth in the query parameters. For example, the query parameters will specify the operand type accepted by the query field and may specify certain matching rules (e.g., "match only to operands after the query field").

For each query field with at least one operand within the range parameters for the first pass, the system assigns the query field to the closest operand within the range parameters (step 520). The system then marks any unmatched query fields in the first pass for processing in the second pass (step 525).

In the example query, the sequential match rules would result in the query fields "top" and "validUntilDate" being matched as follows:

| Type | Value | Operator | Operand1 | Operand2 | Desc | Comments |
|---|---|---|---|---|---|---|
| filterModifier | Top | Equal | 3 | — | | CORRECT match |
| standardField | validUntilDate | range | 2019-10-20T07:00:00.000Z | 2021-10-20T07:00:00.000Z | expire in the next 24 months | CORRECT match |

Since the system was able to match both remaining query fields in the first pass, the system would not need to proceed with the second and third passes in the case of the example query. However, there are many queries for which the second and third passes are applicable.

5.2 Pass #2: Left Shift

For each unmatched query field after the first pass, the system ranks all operands that satisfy the specification for the query field (step 530). In one embodiment, the system ranks the operands by running a typical sorting algorithm on the operands with a comparator comparing two operands at a time, wherein the comparator works as follows:

If both operands being compared are to the right of the unmatched query field, rank the closer operand higher than the farther operand;

If both operands being compared are to the left of the unmatched query field, rank the closer operand higher than the farther operand;

If one operand is on the left and the other is in the right, rank the operand on the right higher if it is within a threshold number of characters to the query field. If the operand on the right is outside the threshold numbers of characters, rank the operand to the left higher if it is closer (else default to the right operand).

In this embodiment, an operand that is on the "left" of a query field, has a lower start index than the query field, and an operand that is on the "right" of a query field has a higher start index than the query field.

The system matches each unmatched query field to the highest-ranked operand that satisfies the specifications for the query field and that is not yet claimed by another query field, prioritizing query fields from left to right (i.e., prioritizing query fields by lowest start index) (step 540). Any query fields unmatched after the second pass are marked for processing in the third pass (step 550).

5.3 Pass #3: Right Shift

For each unmatched query field after the second pass, the system ranks all operands that satisfy the specification for the query field in accordance with the sorting algorithm described above (step 560).

The system matches each unmatched query field to the highest-ranked operand that satisfies the specifications for the query field and is not yet claimed by another query field, prioritizing query fields from right to left (step 570).

6. Example Method for Identifying the Subject(s) of the Query

FIG. 6 illustrates a method, according to one embodiment, for identifying which of the candidate query fields are the subject fields. The system determines if any of the entities associated with the query or group (whichever is applicable) are tagged as an interrogatory or a lookup action (step 610). Examples of interrogatives are the words "who," "what," and "when." Examples of a lookup action are "show me" and "tell me." If there are no interrogatives or look up action entities in the user query, the system determines that there are none of the candidate query fields are subject fields (step 620).

If one or more of the entities are tagged as interrogatives or a lookup action, the system identifies any queryable query fields (e.g., standard fields, object-specific fields) between the interrogative/lookup action and an entity corresponding to the database object (e.g., an entity tagged "object name"), and selects all such field(s) as subject field(s) (step 630). If a subject field is an ambiguous field and there is an interrogative entity, the system resolves any ambiguities based on the value of the interrogative (steps 640, 650). For example, if the subject query field is "created," which may have the value createdBy or createdDate, and the interrogative before the subject query field is "who," the ambiguity will be resolved as "createdBy." Likewise, if the interrogative before the field is "when" the ambiguity will be resolved as "createdDate." In one embodiment, "what" is also resolved in favor of date fields. If there is a second interrogative after the database object (and there is no second database object), then the ambiguity will be resolved in favor of both ambiguous field values.

For instance, take the example query: "Who created the top 3 Acme quotes from last year that are over $20 k that expire in the next 24 months and when?" As discussed above, the query has following candidate query fields:

| Phrase | Type | Value | StartIn | EndIndex |
|---|---|---|---|---|
| Created | standardField | Created | 4 | 10 |
| Top | filterModifier | Top | 16 | 18 |
| Expire | quoteField | validuntilDate | 72 | 77 |

There are two interrogatives in the query, "who," and "when." "Created" and "top" are the two query fields between the interrogative "who" and the object "quotes." Since "created" is of type "standardField", which is a queryable field, the system identifies "created" as the subject field. "Top" is of the type "filterModifier," which is not a queryable field and, therefore, cannot be a subject field.

"Created" is an ambiguous field that can have value "createdBy" or "createdDate." Because of the interrogative "who," the system will resolve this ambiguity in favor or "createdBy." However, because there are no query fields or database objects after the interrogative "when," the system will assume that this interrogative also corresponds to "created" and also add "createdDate" as a subject field.

7. Example System Architecture

Figure 7:
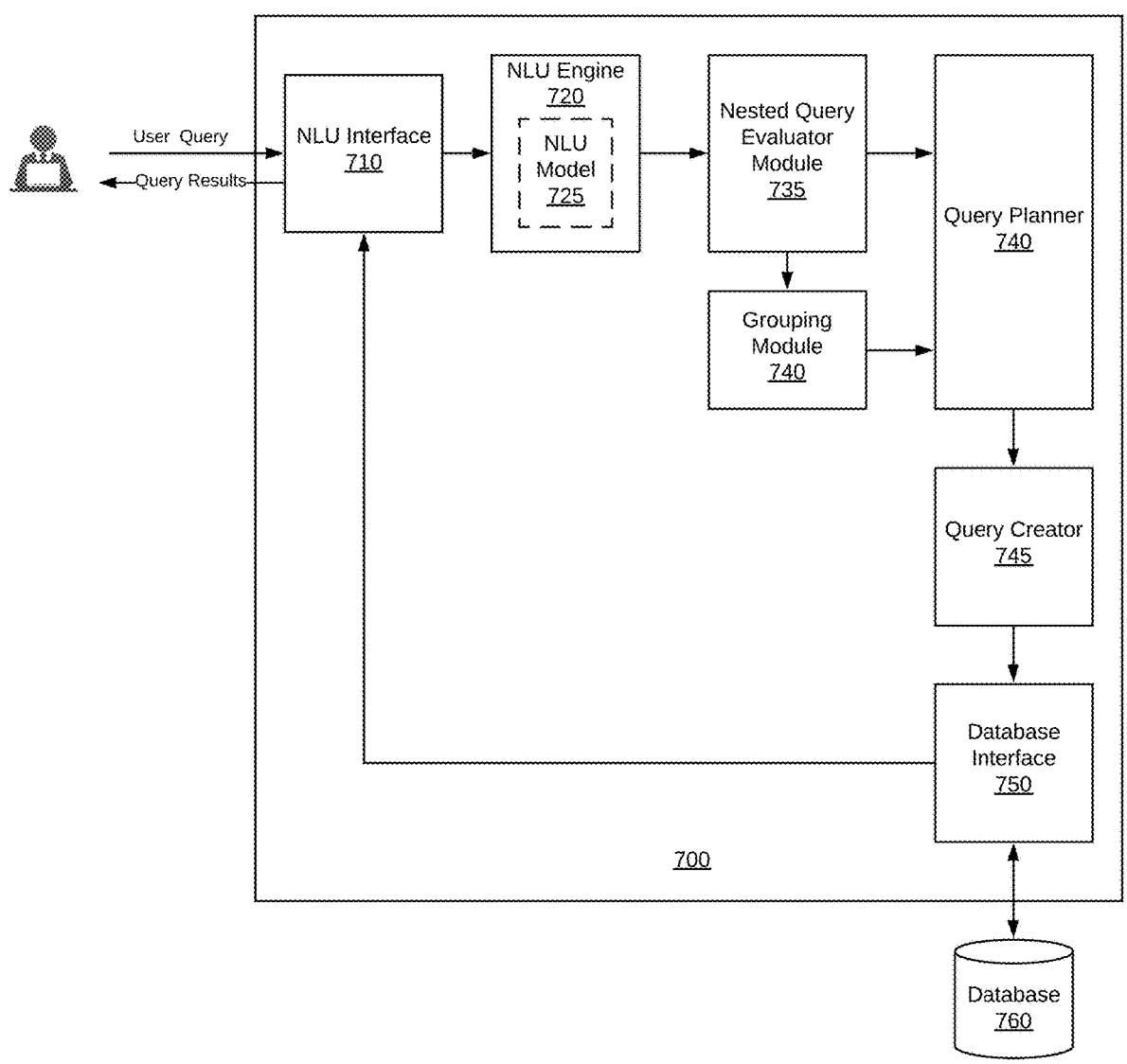
FIG. 7 is a block diagram that illustrates an example software architecture according to one embodiment.

FIG. 7 illustrates an example system architecture for performing the methods described herein. The methods described herein may be implemented in a system configured differently and are not limited to the system architecture illustrated in FIG. 5.

Example system 700 includes an NLU Interface 710, which enables a user to input a natural language query to the system. An NLU Engine 720 applies an NLU model 725 to a user's natural language query to generate an intent and tagged entities for the query. A Nested Query Evaluator Module 730 determines whether the natural language query corresponds to single-object query or a nested query with multiple objects in accordance with the method of FIG. 1. Grouping Module 735 groups candidate query fields, operands, and contextual entities by object name in the case of a nested query in accordance with the method of FIG. 2. Query Planner Module 740 creates a query plan (or query plans in the case of a nested query) in accordance with the method of FIG. 4. Query Creation Module 745 creates a database query based on the query plan(s), and provides the database query to Database Interface 750 which serves as an interface to the queried database 760. Query results are return to the NLU Interface 710, which provides the query results to the user.

Those skilled in art will appreciate the system 700 may include additional modules, not relevant to the methods described herein, for providing B2B application functionality.

In one embodiment, system 700 is any system that is backed by or uses a database, such a customer relationship management (CRM) system or a quote-to-cash system. Quote-to-cash systems integrate and automate end-to-end sell-side processes, from creating a quote for a prospective customer to collecting revenue and managing renewals. For example, quote-to-cash systems facilitate sales transactions by enabling users to configure products, price products, generate quotes, provide product recommendations, create and sign contracts, manage billings, and perform other sell-side business functions. An example of a quote-to-cash system is the APTTUS quote-to-cash suite of products running on the SALESFORCE platform. In one embodiment, a quote-to-cash system is any system that performs at least one or more of the following business functions: (1) configure, price, and quote; (2) contract generation and management; (3) revenue management (e.g., billing and financial reporting); and (4) product recommendations (e.g., identifying upsell and cross sell opportunities) and other machine learning recommendations to optimize the sales process.

8. General

The methods described herein are embodied in software and performed by one or more computer systems (each comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for creating a database query from a user's natural language query, the method comprising:

receiving a user's natural language query via a natural language interface to the system;

applying a natural language model to the user's query to identify an intent and a plurality of entities associated with the user's query, wherein the entities are tagged with an entity type and associated with a normalized value;

identifying any candidate query fields, operands, conjunctions, contextual entities, and database object names from the tagged entities;

determining if the user query includes valid references to two or more database objects;

in response to determining that there is only one valid database object reference, performing the following:

creating a query plan for the query by evaluating the candidate query fields and operands to identify subject fields and conditional parameters for the query, and creating a database query based on the query plan, wherein the database query is in a database query language;

in response to determining that the user query includes valid references to two or more database objects, performing the following:

sorting the candidate query fields, operands, and contextual entities into groups, wherein each group corresponds to one of the valid database object references and wherein sorting the candidate query fields, operands, and contextual entities into groups comprises:

grouping each object-specific query field and immediately following operand with a database object corresponding to the object-specific query field, grouping each object-specific contextual field with a database object reference corresponding to the object-specific contextual field, and grouping each remaining candidate query field, operand, and contextual entity based on the location of the applicable candidate query field, operand, or contextual entity relative to the valid database object references and one or more transitions in the query, wherein a transition is a conjunction separating one valid database object reference and its related query fields and operands from another valid database object reference;

creating a query plan for each group by evaluating the candidate query fields and operands to identify subject fields and conditional parameters for each group; and creating a nested database query using the query plans for each of the groups, wherein the nested database query is in a database query language.

2. The method of claim 1, wherein the system identifies a conjunction meeting the following criteria as a transition: (1) the conjunction is between two valid database object references, and (2) there is no other conjunction between the conjunction being evaluated and the valid database object reference to the right of said conjunction.

3. The method of claim 1, wherein creating a query plan for a group comprises:

obtaining query parameters for the group, including object-specific query parameters corresponding to the database object associated with the group;

determining if any of the candidate query fields in the group are subject fields;

matching the candidate query fields in the group that are not subject fields to operands in the group based on the query parameters for the group, entity tags associated with the operands in the group, and locations of the operands relative to candidate query fields in the group;

matching any operand in the group not matched with a candidate query field to a default query field specified in the query parameters for the group; and creating a query plan for the group that specifies any subject fields identified and adding the query field-operand matches for the group to the query plan as conditional parameters for the group.

4. The method of claim 3, wherein creating a query plan for a group also comprises evaluating the candidate query fields and operands to identify any ordering criteria and record count limit for the group, and adding any identified ordering criteria and record count limit to the query plan for the group.

5. The method of claim 3, wherein the system identifies any queryable field located between (1) an interrogative or a lookup action entity and (2) an object name as a subject field.

6. The method of claim 5, wherein prior to determining if any of the candidate query fields are subject fields, the system preprocesses the candidate query fields and operands.

7. The method of claim 6, wherein preprocessing the operands and candidate query fields comprises removing any redundant, trivial, and subsumed query fields and operands from the candidate query fields and operands.

8. The method of claim 1, wherein the method further comprises:

in response to determining that the user query include valid references to two or more database objects, performing the following:

identifying a first interrogative or lookup action in the user query;

determining the closest of the valid database object references following the first interrogative or lookup action;

determining if the intent identified using the natural language model corresponds to the closest of the valid database object reference following the first interrogative or lookup action; and in response to determining that the intent identified using the natural language model does not correspond to the closest of the valid database object references following the first interrogative or lookup action, correcting the intent to correspond to said closest valid database object reference.

9. The method of claim 1, wherein a valid reference to a database object includes an explicit mention of a database object name in the user query that is not subsumed by a contextual entity, another database object reference, or a query field reference.

10. The method of claim 9, wherein a valid reference to a database object also includes a contextual entity that is a type of database object or an instance of database object.

11. A non-transitory computer-readable medium comprising a computer program that, when executed by a computer system, enables the computer system to perform the following method for creating a database query from a user's natural language query, the method comprising:

receiving a user's natural language query via a natural language interface to the system;

applying a natural language model to the user's query to identify an intent and a plurality of entities associated with the user's query, wherein the entities are tagged with an entity type and associated with a normalized value;

identifying any candidate query fields, operands, conjunctions, contextual entities, and database object names from the tagged entities;

determining if the user query includes valid references to two or more database objects;

in response to determining that there is only one valid database object reference, performing the following:

creating a query plan for the query by evaluating the candidate query fields and operands to identify subject fields and conditional parameters for the query, and creating a database query based on the query plan, wherein the database query is in a database query language;

in response to determining that the user query includes valid references to two or more database objects, performing the following:

sorting the candidate query fields, operands, and contextual entities into groups, wherein each group corresponds to one of the valid database object references and wherein sorting the candidate query fields, operands, and contextual entities into groups comprises:

grouping each object-specific query field and immediately following operand with a database object corresponding to the object-specific query field, grouping each object-specific contextual field with a database object reference corresponding to the object-specific contextual field, and grouping each remaining candidate query field, operand, and contextual entity based on the location of the applicable candidate query field, operand, or contextual entity relative to the valid database object references and one or more transitions in the query, wherein a transition is a conjunction separating one valid database object reference and its related query fields and operands from another valid database object reference;

creating a query plan for each group by evaluating the candidate query fields and operands to identify subject fields and conditional parameters for each group; and creating a nested database query using the query plans for each of the groups, wherein the nested database query is in a database query language.

12. The non-transitory computer-readable medium of claim 11, wherein the system identifies a conjunction meeting the following criteria as a transition: (1) the conjunction is between two valid database object references, and (2) there is no other conjunction between the conjunction being evaluated and the valid database object reference to the right of said conjunction.

13. The non-transitory computer-readable medium of claim 11, wherein creating a query plan for a group comprises:

obtaining query parameters for the group, including object-specific query parameters corresponding to the database object associated with the group;

determining if any of the candidate query fields in the group are subject fields;

matching the candidate query fields in the group that are not subject fields to operands in the group based on the query parameters for the group, entity tags associated with the operands in the group, and locations of the operands relative to candidate query fields in the group;

matching any operand in the group not matched with a candidate query field to a default query field specified in the query parameters for the group; and creating a query plan for the group that specifies any subject fields identified and adding the query field-operand matches for the group to the query plan as conditional parameters for the group.

14. The non-transitory computer-readable medium of claim 11, wherein a valid reference to a database object includes an explicit mention of a database object name in the user query that is not subsumed by a contextual entity, another database object reference, or a query field reference.

15. The non-transitory computer-readable medium of claim 14, wherein a valid reference to a database object also includes a contextual entity that is a type of database object or an instance of database object.

16. A computer system for creating a database query from a user's natural language query, the system comprising:

one or more processors;

one or more memory units coupled to the one or more processors, wherein the one or more memory units store instructions that, when executed by the one or more processors, cause the system to perform the operations of:

receiving a user's natural language query via a natural language interface to the system;

applying a natural language model to the user's query to identify an intent and a plurality of entities associated with the user's query, wherein the entities are tagged with an entity type and associated with a normalized value;

identifying any candidate query fields, operands, conjunctions, contextual entities, and database object names from the tagged entities;

determining if the user query includes valid references to two or more database objects;

in response to determining that there is only one valid database object reference, performing the following:

creating a query plan for the query by evaluating the candidate query fields and operands to identify subject fields and conditional parameters for the query, and creating a database query based on the query plan, wherein the database query is in a database query language;

in response to determining that the user query includes valid references to two or more database objects, performing the following:

sorting the candidate query fields, operands, and contextual entities into groups, wherein each group corresponds to one of the valid database object references and wherein sorting the candidate query fields, operands, and contextual entities into groups comprises:

grouping each object-specific query field and immediately following operand with a database object corresponding to the object-specific query field, grouping each object-specific contextual field with a database object reference corresponding to the object-specific contextual field, and grouping each remaining candidate query field, operand, and contextual entity based on the location of the applicable candidate query field, operand, or contextual entity relative to the valid database object references and one or more transitions in the query, wherein a transition is a conjunction separating one valid database object reference and its related query fields and operands from another valid database object reference;

creating a query plan for each group by evaluating the candidate query fields and operands to identify subject fields and conditional parameters for each group; and creating a nested database query using the query plans for each of the groups, wherein the nested database query is in a database query language.

17. The system of claim 16, wherein the system identifies a conjunction meeting the following criteria as a transition: (1) the conjunction is between two valid database object references, and (2) there is no other conjunction between the conjunction being evaluated and the valid database object reference to the right of said conjunction.

18. The system of claim 16, wherein creating a query plan for a group comprises:

obtaining query parameters for the group, including object-specific query parameters corresponding to the database object associated with the group;

determining if any of the candidate query fields in the group are subject fields;

matching the candidate query fields in the group that are not subject fields to operands in the group based on the query parameters for the group, entity tags associated with the operands in the group, and locations of the operands relative to candidate query fields in the group;

matching any operand in the group not matched with a candidate query field to a default query field specified in the query parameters for the group; and creating a query plan for the group that specifies any subject fields identified and adding the query field-operand matches for the group to the query plan as conditional parameters for the group.

19. The system of claim 18, wherein creating a query plan for a group also comprises evaluating the candidate query fields and operands to identify any ordering criteria and record count limit for the group, and adding any identified ordering criteria and record count limit to the query plan for the group.

20. The system of claim 16, wherein a valid reference to a database object includes an explicit mention of a database object name in the user query that is not subsumed by a contextual entity, another database object reference, or a query field reference.

21. The system of claim 20, wherein a valid reference to a database object also includes a contextual entity that is a type of database object or an instance of database object.

* * * * *